United States Patent
Minematsu

(10) Patent No.: US 10,341,088 B2
(45) Date of Patent: Jul. 2, 2019

(54) AUTHENTIC ENCRYPTION DEVICE, AUTHENTICATED ENCRYPTION METHOD, AND PROGRAM FOR AUTHENTICATED ENCRYPTION

(71) Applicant: NEC Corporation, Tokyo (JP)

(72) Inventor: Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 592 days.

(21) Appl. No.: 14/908,212

(22) PCT Filed: Jun. 24, 2014

(86) PCT No.: PCT/JP2014/003382
§ 371 (c)(1),
(2) Date: Jan. 28, 2016

(87) PCT Pub. No.: WO2015/015702
PCT Pub. Date: Feb. 5, 2015

(65) Prior Publication Data
US 2016/0173276 A1    Jun. 16, 2016

(30) Foreign Application Priority Data

Aug. 2, 2013  (JP) .................. 2013-161446

(51) Int. Cl.
*H04L 9/06* (2006.01)
*H04L 9/32* (2006.01)
*G09C 1/00* (2006.01)

(52) U.S. Cl.
CPC .............. *H04L 9/0625* (2013.01); *G09C 1/00* (2013.01); *H04L 9/32* (2013.01)

(58) Field of Classification Search
CPC ................ H04L 9/0637; H04L 9/0643; H04L 2209/125; H04L 9/3242; H04L 9/0625; H04L 9/0822; H04L 9/3236; H04L 9/0618
See application file for complete search history.

(56) References Cited

U.S. PATENT DOCUMENTS 5,623,549 A   4/1997  Ritter
6,804,355 B1  10/2004 Graunke
(Continued)

FOREIGN PATENT DOCUMENTS

RU            2383934 C2    3/2010

OTHER PUBLICATIONS

Extended European Search Report issued by the European Patent Office for Application No. 14831687.0 dated Feb. 14, 2017 (9 pages).
(Continued)

*Primary Examiner* — Michael R Vaughan
*Assistant Examiner* — Abdullah Almamun
(74) *Attorney, Agent, or Firm* — Wilmer Cutler Pickering Hale and Dorr LLP

(57) ABSTRACT

To achieve one-pass and one-rate authenticated encryption capable of performing parallel processings and totally performing encryption and decode processings by only one encryption function. An authenticated encryption device comprises an authenticated encryption means for applying a two-round Feistel structure using an encryption function assigned with an auxiliary variable for a round function per two blocks to an input plaintext or encrypted text thereby to generate an encrypted text or decoded plaintext. The authenticated encryption means finds an encrypted text chunk CC[i]=(C[i_1], C[i_2]) corresponding to an i-th plaintext chunk MC[i]=(M[i_1], M[i_2]) when dividing a plaintext into chunks per two blocks as:

(Continued)

$$C[i\_1]=F\_K((N,Tw\_i\_1),M[i\_1]) \text{ xor } M[i\_2],$$

$$C[i\_2]=F\_K((N,Tw\_i\_2),C[i\_1]) \text{ xor } M[i\_1].$$

10 Claims, 18 Drawing Sheets

(56) References Cited

U.S. PATENT DOCUMENTS

| | | | |
|---|---|---|---|
| 8,321,675 B2 | 11/2012 | Rogaway | |
| 8,687,800 B2* | 4/2014 | Patel | H04L 9/0637 380/28 |
| 2002/0025037 A1* | 2/2002 | Sano | H04L 9/0643 380/44 |
| 2002/0078342 A1* | 6/2002 | Matthews, Jr. | H04L 63/0428 713/151 |
| 2002/0083317 A1* | 6/2002 | Ohta | H04L 9/0618 713/161 |
| 2003/0223585 A1* | 12/2003 | Tardo | H04L 9/3226 380/277 |
| 2004/0131180 A1* | 7/2004 | Mazuz | H04L 9/0625 380/37 |
| 2006/0285684 A1 | 12/2006 | Rogaway | |
| 2009/0119510 A1* | 5/2009 | Long | H04L 9/0631 713/171 |
| 2010/0027783 A1 | 2/2010 | Yup | |
| 2010/0061550 A1* | 3/2010 | Nakamura | H04L 9/0891 380/44 |
| 2011/0238636 A1* | 9/2011 | Shirai | H04L 9/0643 707/693 |
| 2014/0146964 A1* | 5/2014 | Yamada | H04L 9/0637 380/28 |
| 2015/0010142 A1* | 1/2015 | Hwang | H04L 63/0428 380/28 |
| 2015/0039904 A1* | 2/2015 | Matsuda | H04L 9/0618 713/189 |
| 2015/0149771 A1* | 5/2015 | Yen | G06F 21/6209 713/165 |

OTHER PUBLICATIONS

Fischlin, M., et al., "Robust Multi-property Combiners for Hash Functions Revisited," Automata, Languages and Programming (Book Series: Lecture Notes in Computer Science), pp. 655-666 (Jul. 7, 2008).

Russia Office Action issued in Russian Patent Application No. 2016107391/08(011613), dated Sep. 26, 2017, 17 pages.

International Search Report corresponding to PCT/JP2014/003382, dated Aug. 12, 2014 (5 pages).

Kazuhiko Minematsu, "Improved Security Analysis of XEX and LRW Modes," Selected Areas in Cryptography 2006, pp. 92-109.

Morris Dworkin, "Recommendation for Block Cipher Modes of Operation: The CCM Mode for Authentication and Confidentiality," [online] May 2005, National Institute of Standards and Technology, NIST Special Publication 800-38C, (26 pages), URL:http://www.csrc.nist.gov/publications/nistpubs/800-38C/SP800-38C_updated-July20_2007.pdf.

Moses Liskov, et al., "Tweakable Block Ciphers," Advances in Cryptology-CRYPTO 2002, Lecture Notes in Computer Science 2442, Springer Verlag Berlin Heidelberg 2002, pp. 31-46.

Phillip Rogaway, Efficient Instantiations of Tweakable Blockciphers and Refinements to Modes OCB and PMAC, Advances in Cryptology—ASIACRYPT 2004, LNCS 3329, pp. 16-31.

Niels Ferguson, et al., "The Skein Hash Function Family," Version 1.1, [online] Nov. 2008, (76 pages), URL:http://www.skein-hash.info/sites/default/files/skein1.1.pdf.

Erik Anderson, et al., "Manticore and CS Mode: Parallelizable Encryption with Joint Cipher-State Authentication," Sandia Report, SAND2004-5113, Sandia National Laboratories Oct. 2004, pp. 1-33, [online], URL:http://www.osti.gov/scitech/biblio/919631.pdf.

* cited by examiner

AUTHENTIC ENCRYPTION DEVICE, AUTHENTICATED ENCRYPTION METHOD, AND PROGRAM FOR AUTHENTICATED ENCRYPTION

CROSS-REFERENCE TO RELATED APPLICATIONS

This application is a national stage application of International Application No. PCT/JP2014/003382 entitled "Authenticated Encryption Device, Authenticated Encryption Method, and Program for Authenticated Encryption," filed on Jun. 24, 2014, which claims priority to Japanese Patent Application No. 2013-161446, filed on Aug. 2, 2013, the disclosures of each which are hereby incorporated by reference in their entirety.

TECHNICAL FIELD

The present invention relates to an authenticated encryption device for performing authenticated encryption by use of a common key, an encryption device, a decode device, an authenticated encryption method, and a program for authenticated encryption.

BACKGROUND ART

Authenticated Encryption (AE) is a technique for encrypting a plaintext message and giving a message authentication code (MAC) thereto at the same time by use of a previously-shared secret key. The use of authenticated encryption enables contents to be protected against eavesdropping, and unauthorized manipulation to be detected. If authenticated encryption is applied to communication paths, strong protection for the contents to be communicated can be achieved.

Basic input and output of authenticated encryption will be described below. Two persons sharing a secret key K will be assumed below as Alice and Bob, and a message encrypted by authenticated encryption is assumed to be communicated from Alice to Bob.

An encryption function and a decode function for authenticated encryption are assumed as AEnc_K and ADec_K, respectively. A plaintext to be encrypted is assumed as M and a variable N called initial vector is introduced. The initial vector N is generally a random number with a short fixed length or a counter, which is generated by Alice.

The encryption processing on Alice side will be first described. Alice generates the initial vector N, and then executes (C, T)=AEnc_K(N, M). Herein, AEnc_K is called encryption function using the key K as a parameter, C is called encrypted text, and T is called authenticated tag, which are variables for detecting an altered fixed length. Alice transmits a combination (N, C, T) of initial vector N, resultant encrypted text C, and resultant authentication tag T to Bob.

The decode processing on Bob side will be described below. Herein, the information which Bob receives from Alice is assumed as (N', C', T'). When receiving the information from Alice, Bob executes ADec_K(N', C', T') as the decode processing. ADec_K is a decode function using the key K as a parameter. If communication is altered in the middle and (N', C', T') is different from (N, C, T), assuming a symbol indicating alternation as ¥bot, ADec_K(N', C', T') outputs ¥bot. Without alternation and in the case of (N', C', T')=(N, C, T), ADec_K(N', C', T') outputs a decoded plaintext M' having the same contents as the plaintext M encrypted by Alice. Thereby, M is correctly decoded.

Practically, the input and output include a variable called header H in many cases. The header H is not to be encrypted, but is information for message authentication to be used for expressing a protocol version or the like, for example.

With the header H included, the encryption function is input/output of (C, T)=AEnc_K(N, M, H), and encrypts the plaintext M and gives a message authentication code to a combination of plaintext M and header H. Alice transmits a combination (N, H, C, T) of initial vector N, header H, resultant encrypted text C, and resultant authentication tag T to Bob.

When input/output of ADec_K(N', C', T', H') is obtained and (N', C', T', H') is different from (N, C, T, H), the decode function outputs the symbol bot indicating alternation. When the received (N', H', C', T') is not altered or (N', H', C', T')=(N, H, C, T) is established, Bob on the reception side can correctly decode M and confirm that the header H is not altered.

The authenticated encryption with the input/output added with the header H may be called authenticated encryption with associated data (AEAD), and will be simply denoted as "authenticated encryption" below unless otherwise stated.

One of the authenticated encryption realization methods is based on generic composition. This is a method using a combination of secure encryption system and secure MAC system. For example, with a well-known combination Enc-then-Auth, two keys K1 and K2 are used to realize authenticated encryption with (C, T)=MAC_K2(N, Enc_K1(M)). Herein, Enc_XX indicates an encryption function used in the encryption system, and MAC_XX indicates a MAC given function used in the MAC system.

When block encryption such as AES (Advanced Encryption Standard) encryption is used, for example, the encryption system may employ AES counter mode encryption, and the MAC system may employ CMAC-AES (Cipher-based MAC-AES). Further, as a method for performing authenticated encryption by use of one block encryption key without the use of two keys, there is known an authenticated encryption system called CCM mode (Counter with CBC-MAC) (Non-Patent Literature 1, for example).

However, all the above methods require two-pass processings including encryption and MAC giving. That is, data needs to be entirely scanned at least twice. Further, when an input plaintext is of m blocks, the block encryption needs to be called about m times for encryption and MAC function used in the CCM system. Therefore, the block encryption needs to be called about 2 m times for the authenticated encryption processing on an m-block plaintext. That is, the processing function such as encryption function or MAC given function needs to be called twice per plaintext block. The system in which the processing function is called twice for each block is also called two-rate system. The two-pass or two-rate system has a problem that the processing takes a long time and has a heavy load.

One approach for solving the problem is a one-pass authenticated encryption system using block encryption.

An authenticated encryption system called OCB mode described in Patent Literature 1 is first proposed (which will be called OCB system below). The OCB system is such that block encryption called Tweakable block encryption described in Non-Patent Literature 2 is extended.

The Tweakable block encryption is an authenticated encryption system in which an auxiliary variable called Tweak is introduced to encryption and decode. When a block size is n-bit, encryption with the Tweakable block encryption can be expressed as "TE_K(Tw, M)=C," and decode can be expressed as "TD_K(Tw, C)=M." For any combination (K, Tw), TE_K(Tw, *) configures substitution in the n-bit space. Its inverse substitution is TD_K(Tw, *). Tw indicates an auxiliary variable Tweak, and * indicates a variable. The auxiliary variable Tw is required for decode, but if it is released, the safety of the Tweakable block encryption is not influenced.

In the OCB system, at first, an encryption function of typical block encryption is converted into an encryption function of Tweakable block encryption or a Tweak-assigned encryption function by use of an XEX mode described in Non-Patent Literature 3. Then, the following TE_K function is called to encrypt an initial vector N and a plaintext M=(M[1], M[2], . . . , M[m]). Each M[i] is assumed as n-bit block. The TE_K function used in the OCB system employs a variable (N, i) corresponding to Tweak. N indicates an initial vector and i indicates a block identification number.

$$C[1] = TE\_K((N, 1), M[1]),$$

$$C[2] = TE\_K((N, 2), M[2]),$$

$$\ldots,$$

$$C[m] = TE\_K((N, m), M[m])$$

An authentication tag T is found by calling the same TE_K function as the message as follows, for example, for SUM=M[1] xor M[2] xor . . . M[m] which is XOR (exclusive OR) of all the plaintext blocks.

$$T = TE\_K((N, m+1), SUM)$$

The TE_K function used in the OCB system is executed by adding Tw=(N, i) and a sequence mask_K(N, i) calculated by the secret key K to the input/output of the encryption function E_K of block encryption (converted in the XEX mode). The conversion equation in the XEX mode is expressed as follows. The conversion equation may be called XEX conversion equation below.

$$TE\_K((N,i),M[i]) = E\_K(M[i] \text{ xor mask}\_K(N,i)) \text{ xor mask}\_K(N,i)$$

E_K is used for calculating mask, and efficient sequential processings are enabled in the OCB system. That is, calculations from mask_K(N, i) to mask_K(N, i+1) can be efficiently made.

FIG. 19 is an explanatory diagram schematically illustrating an encryption processing in the OCB system. In FIG. 19, the blocks in dashed lines correspond to TE_K((N, i), *). The progress of a processing of calculating a mask sequence is omitted in FIG. 19.

As illustrated in FIG. 19, E_K is called once for calculating L for finding a mask sequence and an authentication tag T, respectively, in the OCB system, but a one-pass processing is possible as a whole. Further, the processing in each block can be performed in parallel except the calculation of a mask sequence. More specifically, the number of calls of block encryption for an m-block plaintext is almost m, and is almost half that of other two-pass authenticated encryption systems such as CCM system and GCM (Galois/Counter mode) system.

CITATION LIST

Patent Literature

PTL 1: U.S. Pat. No. 8,321,675 Specification

Non Patent Literature

NPL 1: Morris Dworkin, "Recommendation for Block Cipher Modes of Operation: The CCM Mode for Authentication and Confidentiality.", [online] May 2005, NIST Special Publication 800-38C, Internet <URL: http://csrc.nist.gov/publications/nistpubs/800-38C/SP800-38C_updated-July20_2007.pdf>

NPL 2: Moses Liskov, Ronald L. Rivest, David Wagner, "Tweakable Block Ciphers.", 2002, Advances in Cryptology-CRYPTO 2002, Lecture Notes in Computer Science 2442 Springer 2002, p. 31-46.

NPL 3: P. Rogaway, "Efficient Instantiations of Tweakable Blockciphers and Refinements to Modes OCB and PMAC.", 2004, Advances in Cryptology-ASIACRYPT '04, LNCS 3329, p. 16-31.

SUMMARY OF INVENTION

Technical Problem

FIG. 20 is an explanatory diagram schematically illustrating a decode processing in the OCB system. In the CCM mode or GCM, the decode processing as authentication encryption is achieved by only an encryption function E_K of block encryption, while in the OCB system, as illustrated in FIG. 20, not only an encryption function E_K of block encryption but also a decode function D_K of block encryption is required for the decode processing of Tweakable block encryption.

When both the encryption function and the decode function of block encryption as parts are required for encryption and decode of authentication encryption, loads on the mounting increase due to memory or circuit size. Representative block encryption AES is generally slower in the decode processing than in encryption, and the fact indicates that a difference in performance is caused between the encryption processing and the decode processing in the OCB system using AES, or the like.

The OCB and its similar one-pass authenticated encryption system cannot solve the above problem.

It is therefore an object of the present invention to provide an authenticated encryption device for achieving one-pass and one-rate authenticated encryption capable of performing parallel processings and totally performing encryption and decode processings by use of only one encryption function, an encryption device, a decode device, an authenticated encryption method, and a program for authenticated encryption.

Solution to Problem

An authenticated encryption device according to the present invention is characterized by including an authenticated encryption means for applying a two-round Feistel structure using an encryption function assigned with an auxiliary variable for a round function per two blocks to an input plaintext or encrypted text thereby to generate an encrypted text or decoded plaintext, and applying the encryption function to a checksum calculated by use of some bits in the input plaintext or the decoded plaintext thereby to generate an authentication tag.

An encryption device according to the present invention is characterized by including an encryption means for applying a two-round Feistel structure using an encryption function assigned with an auxiliary variable for a round function per two blocks to an input plaintext thereby to generate an encrypted text, and applying the encryption function to a checksum calculated by use of some bits in the input plaintext thereby to generate an authentication tag.

A decode device according to the present invention is characterized by including a decode means for applying a two-round Feistel structure using an encryption function assigned with an auxiliary variable for a round function per two blocks to an input encrypted text thereby to generate a decoded plaintext, and applying the encryption function to a checksum calculated by use of some bits in the decoded plaintext thereby to generate an authentication tag.

An authenticated encryption method according to the present invention is characterized in that an information processing apparatus applies a two-round Feistel structure using an encryption function assigned with an auxiliary variable for a round function per two blocks to an input plaintext or encrypted text thereby to generate an encrypted text or decoded plaintext, and applies the encryption function to a checksum calculated by use of some bits in the input plaintext or the decoded plaintext thereby to generate an authentication tag.

A program for authenticated encryption according to the present invention is characterized by causing a computer to perform a processing of applying a two-round Feistel structure using an encryption function assigned with an auxiliary variable for a round function per two blocks to an input plaintext or encrypted text thereby to generate an encrypted text or decoded plaintext, and applying the encryption function to a checksum calculated by use of some bits in the input plaintext or the decoded plaintext thereby to generate an authentication tag.

Advantageous Effects of Invention

According to the present invention, it is possible to achieve one-pass and one-rate authenticated encryption capable of performing parallel processings and totally performing encryption and decode processings by use of only one encryption function.

DESCRIPTION OF EMBODIMENTS

An outline of the present invention will be first described. The present invention relates to an encryption system using a common secret key based on a block encryption system for conducting encryption per predetermined size. The present invention applies a two-round Feistel structure per two blocks. An encryption function assigned with an auxiliary variable Tw called Tweak (adjusted value) is used for a round function of the two-round Feistel structure. The Feistel structure is used for authenticated encryption in units of two blocks in this way, thereby solving the above problem.

The authenticated encryption system according to the present invention will be more specifically described below. The present invention uses the following sequences of variables assuming an auxiliary variable Tw introduced into an encryption function. A sequence of variables used as auxiliary variable Tw may be called "auxiliary sequence" below. The auxiliary sequence is configured such that different values are input into all the encryption functions to be called while encryption is being conducted by one key. There will be described below a case in which an auxiliary sequence in a combination of initial vector N with a different value for encrypting one plaintext, identifier i for identifying a chunk in units of two blocks, and j for identifying a block in the chunk from other processing, or a combination of (N, i, j) is used as the auxiliary variable Tw, but the auxiliary sequence is not limited thereto. The auxiliary sequence is configured to be able to generate the same value for one plaintext during both encryption and decode. For example, a value for generating an auxiliary sequence is previously defined. The above example meets the above condition since a value of the auxiliary sequence can be uniquely defined based on the initial vector and a length of the plaintext or encrypted text.

For example, when the number of blocks in a plaintext or encrypted text to be processed is 2m assuming each block having n bits, it may be assumed that (N, 1, 1), (N, 1, 2), (N, 2, 1), (N, 2, 2), . . . , (N, m, 1), (N, m, 2) are used as auxiliary sequences depending on the index of each block, and (N, m, 3) is used as an auxiliary sequence for generating an authentication tag.

With the auxiliary sequences defined in this way, a plaintext M to be encrypted is processed in two-block chunks in the encryption processing. An i-th encrypted text chunk (C[2i], C[2i−1]) is generated for an i-th plaintext chunk (M[2i−1], M[2i], where (i=1, . . . , m)) by use of auxiliary sequences (N, i, 1), (N, i, 2) and a keyed pseudo random function F_K(*, *) as a pseudo random function with two input variables. The "pseudo random function" is the name of an encryption function based on its property. The pseudo random function may be an encryption function of block encryption or a keyed hash function, for example.

Figure 1:
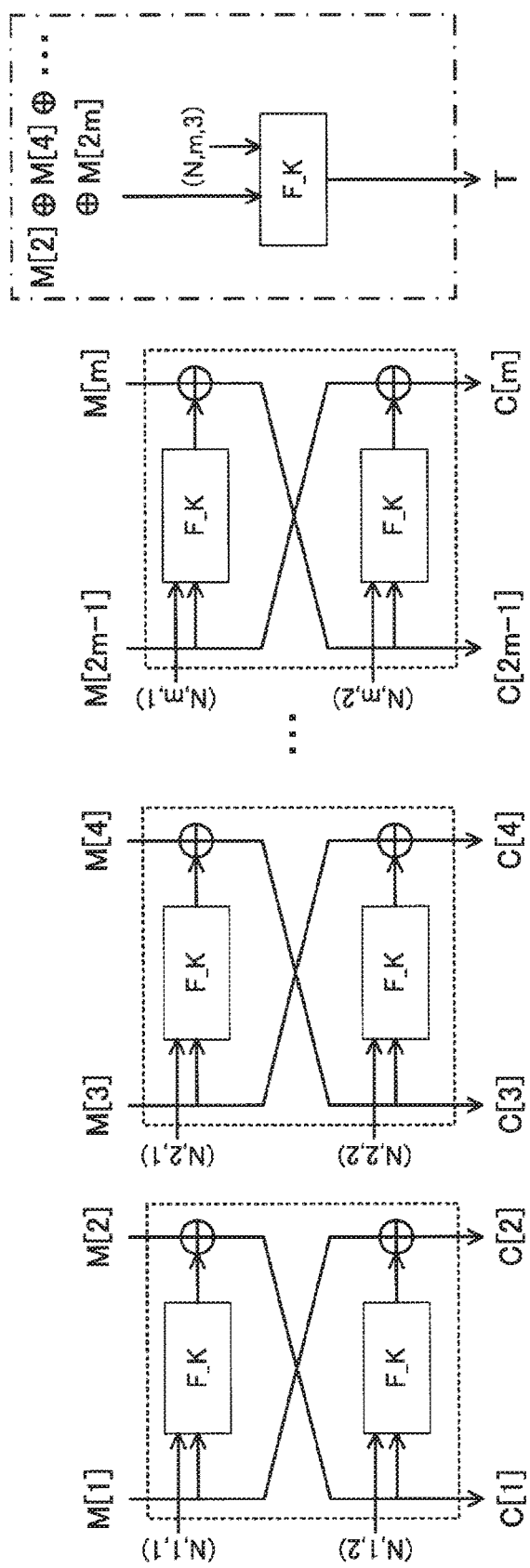
FIG. 1 It depicts an explanatory diagram schematically illustrating an exemplary processing flow of an entire encryption processing according to the present invention.

FIG. 1 is an explanatory diagram schematically illustrating an exemplary processing flow of an entire encryption processing according to the present invention. In FIG. 1, the blocks in dashed lines are in the two-round Feistel structure, and correspond to the processing blocks in the encryption processing in unis of two blocks. For example, assuming a first input variable as an auxiliary sequence, an i-th encrypted text chunk (C[2i], C[2i−1]) is acquired in each processing block as follows by use of F_K((N, i, 1), *) with the auxiliary sequence (N, i, 1) as the first input variable, and F_K((N, i, 2), *) with the auxiliary sequence (N, i, 2) as the first input variable. xor indicates exclusive OR per bit.

$$C[2i-1]=F\_K((N,i,1),M[2i-1]) \text{xor } M[2i],$$

$$C[2i]=F\_K((N,i,2),C[2i-1]) \text{xor } M[2i-1] \quad \text{Equation (1)}$$

Equation (1) indicates that XOR of a result obtained by running the pseudo random function F_K on an odd block M[2i−1] in an i-th plaintext chunk by use of the auxiliary sequence (N, i, 1) corresponding to the odd block in the i-th plaintext chunk, and an even block M[2i] in the i-th plaintext chunk is assumed as the encrypted text block C[2i−1] as an odd block in an i-th encrypted text chunk, and XOR of a result obtained by running the pseudo random function F_K on the thus-obtained encrypted text block C[2i−1] by use of the auxiliary sequence (N, i, 2) corresponding to the even block in the i-th plaintext chunk, and the odd block M[2i−1] in the i-th plaintext chunk is assumed as the encrypted text block C[2i] as an even block in the i-th encrypted text chunk. The processing is performed on all the chunks.

In addition to the above processing, an authentication tag T is generated for a plaintext checksum SUM=M[2] xor M[4] xor . . . xor M[2m] taking XOR for all the even blocks M[2], M[4], . . . , M[2m] in the plaintext by use of the auxiliary sequence (N, m, 3) of the pseudo random function F_K with two input variables having the key K. In FIG. 1, the block in a dashed-dotted line corresponds to the processing block for the authentication tag generation processing. The authentication tag T is acquired as follows by use of F_K((N, m, 3), *) using the auxiliary sequence (N, m, 3) as the first input variable, for example. The XOR in calculating SUM may be addition in any group, such as arithmetic addition.

$$T=F\_K((N,m,3),\text{SUM}) \quad \text{Equation (2)}$$

The processings for the even blocks and the odd blocks may be replaced with each other. In this case, a plaintext checksum may be generated from each odd block. Further, the division into chunks in units of two blocks is not limited thereto. When the need of a sequence processing is not relatively high, such as no online calculation, one chunk may be created with the first block and the third block, for example. The auxiliary sequence may be configured such that different values are input into all the pseudo random functions in the figure while encryption is being conducted by one key. In the figure, the symbol of circled + indicates taking XOR.

The encrypted text C, the initial vector N, and the authentication tag T are sent to the decode side.

When the encrypted text C to be decoded, the initial vector N, and the authentication tag T are input on the decode side, auxiliary sequences are first determined according to the same rule. For example, assuming the encrypted text C=(C[1], C[2], . . . , C[2m]) with each block having n bits, (N, 1, 1), (N, 1, 2), (N, 2, 1), (N, 2, 2), . . . , (N, m, 1), (N, m, 2) may be determined to be used as auxiliary sequences depending on the index of each block in the encrypted text C and (N, m, 3) may be determined to be used as an auxiliary sequence for generating an authentication tag based on the information on the initial vector N and a length of the encrypted text.

Also in the decode processing, the encrypted text C to be decoded is divided into chunks in units of two blocks, and the decode processing using the two-round Feistel structure configured of the pseudo random function F_K(*, *) with the same auxiliary sequence as in the encryption introduced is performed on an i-th encrypted text chunk (C[2i−1], C[2i], where (i=1, . . . , m)). Thereby, the decoded plaintext chunk (M'[2i], M'[2i−1]) can be acquired.

Further, when the same processing as the processing performed during encryption is performed based on the plaintext checksum taking XOR for all the resultant even blocks M'[2], M'[4], . . . , M'[2m] in the plaintext, a decode examination authentication tag T is acquired.

Figure 2:
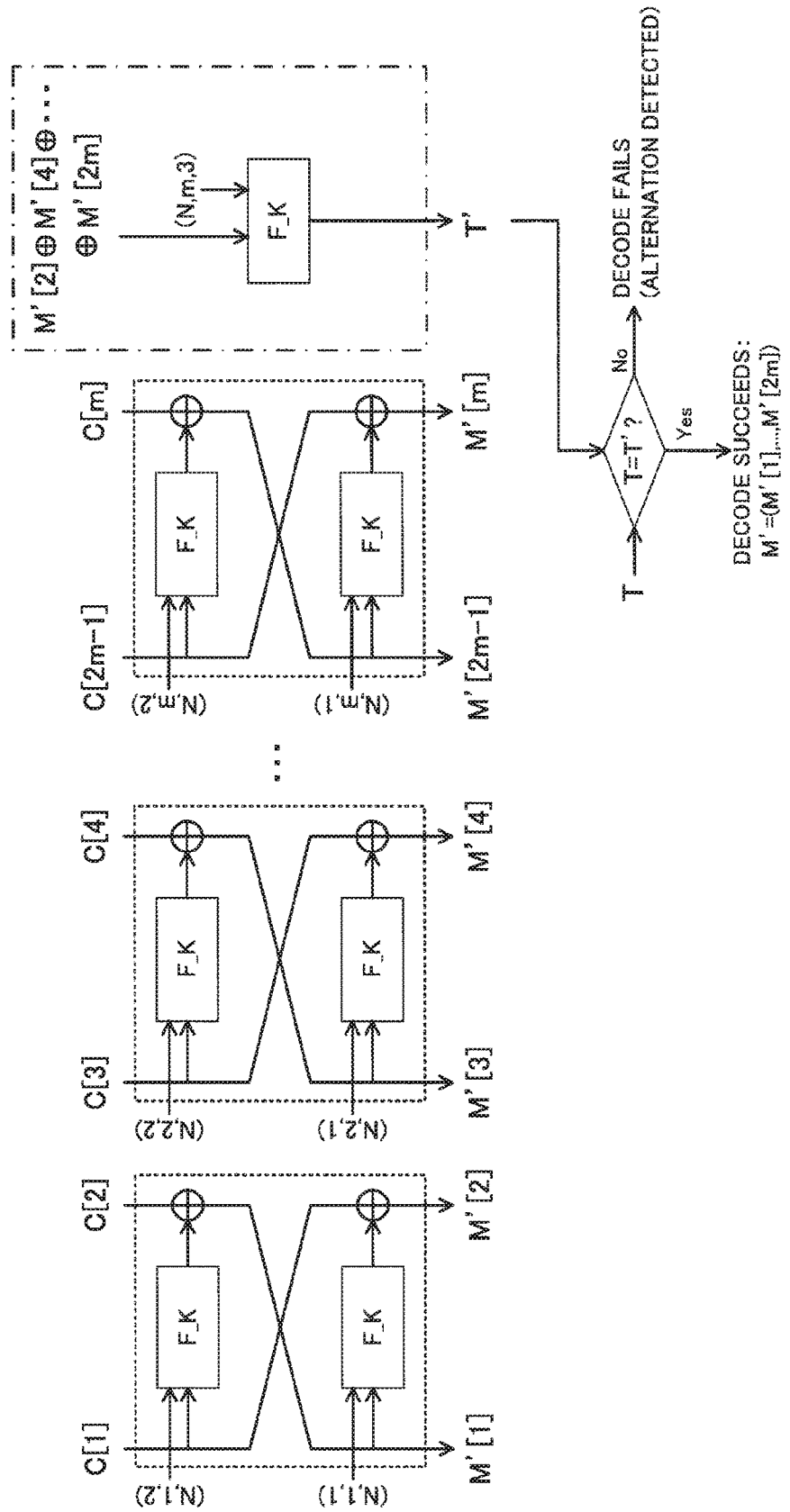
FIG. 2 It depicts an explanatory diagram schematically illustrating an exemplary processing flow of an entire decode processing according to the present invention.

FIG. 2 is an explanatory diagram schematically illustrating an exemplary processing flow of an entire decode processing according to the present invention. In FIG. 2, the blocks in dashed lines are in the two-round Feistel structure, and correspond to the processing blocks of the decode processing in units of two blocks. In each processing block, the plaintext blocks M'[2i] and M'[2i−1] decoded as follows are acquired by use of F_K((N, i, 1), *) using the auxiliary sequence (N, i, 1) as the first input variable and F_K((N, i, 2), *) using the auxiliary sequence (N, i, 2) as the first input variable.

$$M'[2i-1]=F\_K((N,i,2),C[2i-1]) \text{xor } C[2i],$$

$$M'[2i]=F\_K((N,i,1),M'[2i-1]) \text{xor } C[2i-1] \quad \text{Equation (3)}$$

These processings are performed on all the encrypted text chunks. A decode examination authentication tag T' is generated for the plaintext checksum SUM'=M'[2] xor M'[4] xor . . . xor M'[2m] for decode examination taking XOR for all the even blocks M'[2], M'[4], . . . , M'[2m] in the decoded plaintext by use of the auxiliary sequence (N, m, 3) for generating an authentication tag of the decoded plaintext and the pseudo random function F_K with two input variables having the key K. In FIG. 2, the block in a dashed-dotted line corresponds to the processing block of the authentication tag generation processing. The decode examination authentication tag T' is acquired as follows by use of F_K((N, m, 3), *) using the auxiliary sequence (N, m, 3) as the first input variable.

$$T'=F\_K((N,m,3),SUM') \quad \text{Equation (4)}$$

When the decode examination authentication tag T' is acquired, a check is made as to whether the input authentication tag T matches the decode examination authentication tag T', and when they match, the decoded plaintext M'=(M'[1], M'[2], ..., M'[2m]) is output. When they do not match, an error message indicating a decode error is output.

An encrypted text can be correctly decoded in the present decode system since the two-round Feistel structure configures substitution for any round function so that when a key and an auxiliary variable for an encryption function are determined, the plaintext chunks and the encrypted text chunks correspond to each other in an one-to-one manner, an auxiliary sequence is configured to be uniquely defined based on the initial vector and a length of the plaintext or encrypted text, and the same auxiliary sequence is used for both encryption and decode.

Additionally, the inverse processing of the round function itself (the processing of finding input from output of the function) is not required in the processings at individual rounds in the two-round Feistel structure, and the inverse processing of the round function is not entirely required. In the present system, the encryption function is used for the round function, and thus the inverse processing of the encryption function is not required for converting a plaintext into an encrypted text. Further, the same processing is performed during both encryption and decode in the authentication tag generation processing, and thus the inverse processing of the encryption function is not required also in the processing.

Safety of the present system leads to safety of the encryption function. This is because the present system is configured to generate an authentication tag based on SUM of even blocks to which the encryption function is applied twice in the two-round Feistel structure. When an encrypted text is decoded, a random number, which the attacker who alters (and does not know the key, of course) cannot predict, is highly likely to occur in any of the even blocks as a result of the decode, and thus its XOR, or the plaintext checksum cannot be predicted, too. Thereby, the decode examination authentication tag T', which is acquired by inputting the plaintext checksum into the encryption function, is also unpredictable.

According to the present system, the authenticated encryption is achieved by only the encryption function, and thus a keyed hash function such as HMAC can be employed. Further, various encryption techniques may be based in addition to block encryption or hash encryption.

According to the present system, the processings are independent in units of two blocks, and the plaintext blocks, for which the plaintext checksum for authentication tag can be also acquired, can be acquired in the sequential calculation processings, and thus online calculation can be made.

An authenticated encryption system applying the authenticated encryption system for plaintext to be divided into even blocks will be described below according to a first exemplary embodiment. There will be described in a more expanded manner, according to second and subsequent exemplary embodiments, an authenticated encryption system applying the authenticated encryption system capable of coping with a case in which a size of the last block is less than a block size or odd blocks are caused.

First Exemplary Embodiment

Figure 3:
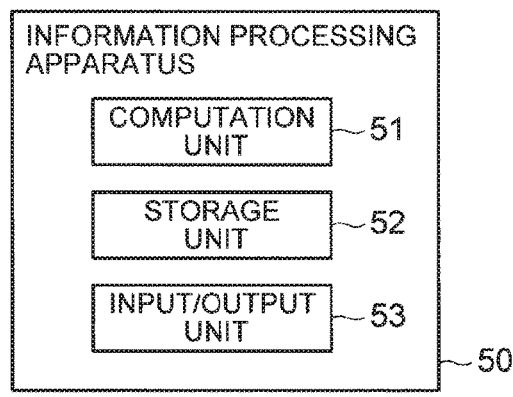
FIG. 3 It depicts a block diagram illustrating an exemplary device provided in an authenticated encryption system.

An exemplary structure of the authenticated encryption system according to the first exemplary embodiment of the present invention will be described with reference to FIG. 3, FIG. 4, and FIG. 5. FIG. 3 is a block diagram illustrating an exemplary apparatus provided in the authenticated encryption system according to the present exemplary embodiment. As illustrated in FIG. 3, the system according to the present exemplary embodiment includes an information processing apparatus 50. The information processing apparatus 50 includes a computation unit 51, a storage unit 52, and an input/output unit 53. The information processing apparatus 50 is a personal computer operating according to a program, or the like, for example. In this case, the computation unit 51, the storage unit 52, and the input/output unit 53 are realized by CPU, memory, and various input/output devices (such as keyboard, mouse, and network interface unit), respectively. FIG. 3 illustrates that one apparatus includes all of the computation unit 51, the storage unit 52, and the input/output unit 53, but the computation unit 51, the storage unit 52, and the input/output unit 53 may be distributed into a plurality of devices.

Figure 4:
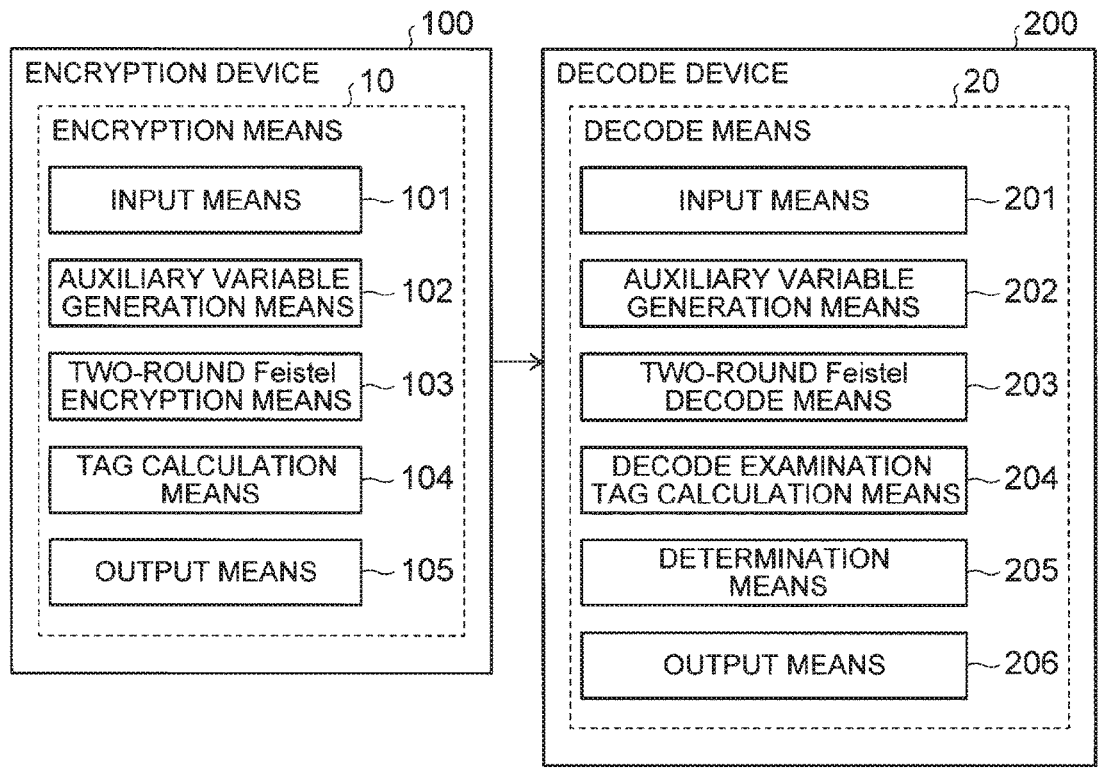
FIG. 4 It depicts a block diagram illustrating an exemplary functional structure of the authenticated encryption system.

FIG. 4 is a block diagram illustrating an exemplary functional structure of the authenticated encryption system according to the present exemplary embodiment. As illustrated in FIG. 4, the authenticated encryption system may include an encryption device 100 including an encryption means 10, and a decode device 200 including a decode means 20. The encryption device 100 and the decode device 200 are realized by the information processing apparatus 50 as illustrated in FIG. 3, for example.

The encryption means 10 provided in the encryption device 100 will be first described. The encryption means 10 has an input means 101, an auxiliary variable generation means 102, a two-round Feistel encryption means 103, a tag calculation means 104, and an output means 105.

In the following, the length of one block will be assumed at n bits unless otherwise stated.

The input means 101 inputs a plaintext M to be encrypted, and an initial vector N. The input means 101 is realized by a character input device such as keyboard. It will be assumed below that a plaintext M=(M[1], ..., M[2m]) having even numbers of blocks is input. The initial vector N is assumed to have n bits for simplicity, but if it is shorter, proper padding is performed, or a pseudo random function with n-bit output and variable-length input (which can be realized by CMAC or HMAC, for example) is additionally applied to reduce to n bits. Herein, padding is to couple a fixed sequence to the tail of a binary sequence thereby to achieve a specific length. For example, zero padding or 10* padding (the first is 1 followed by 00 ... 0) is employed. The latter is effective in preventing the sequences with different lengths from having the same value after padding. In this case, zero padding may be employed.

The auxiliary variable generation means 102 generates an auxiliary variable generally called Tweak or adjusted value, which is given to a pseudo random function in the decode processing, based on the information on the initial vector N and a length of the plaintext M. According to the present exemplary embodiment, a sequence of variables (auxiliary sequence) as described below is generated as auxiliary variables. One auxiliary sequence is expressed by a vector having three elements in a form of (N, i, j) for the positive integers i and j. When the plaintext has 2m blocks, the auxiliary sequences are (N, 1, 1), (N, 1, 2), (N, 2, 1), (N, 2, 2), . . . , (N, m−1, 1), (N, m−1, 2), (N, m, 1), (N, m, 2), (N, m, 3). The variables other than the last one are used for encryption, and only the last one is used for generating an authentication tag.

The two-round Feistel encryption means 103 is directed for performing each block processing in a dashed line in FIG. 1, and performs encryption by dividing the plaintext M in units of two blocks and by using the pseudo random function F_K(*, *) with auxiliary input and two input variables. The pseudo random function F_K(*, *) with two input variables is a keyed n-bit output function, in which F_K(x, y) for arbitrary x and y is output which cannot be discriminated from a random number by a person who does not know the key K.

There will be described below a case in which any of the auxiliary sequences is input into the first input variable in F_K(*, *) and an n-bit variable as a plaintext block to be encrypted is input into the second. Also in the present exemplary embodiment, MC[i]=(M[2i−1], M[2i]) is assumed for the plaintext M=(M[1], . . . , M[2m]), and MC[i] among them is called i-th plaintext chunk. Further, CC[i]=(C[2i−1], C[2i]) is assumed, and CC[i] among them is called i-th encrypted text chunk.

The two-round Feistel encryption means 103 processes a plaintext chunk MC[i] for each i=1, . . . , m as in Equation (1), for example, thereby to acquire an encrypted text chunk CC[i].

As previously described, F_K(*, *) can be realized by various encryption functions. For example, an encryption function of block encryption can be employed. When an encryption function E(*) of n-bit block encryption is employed, Y=F_K((N, i, j), X) can be efficiently calculated by use of extended block encryption called Tweakable block encryption.

Specifically, the calculation can be realized by adding Tweak (N, i, j) and a sequence mask_K(N, i, j) calculated from the secret key K to the input of block encryption by use of the XEX mode described in Non-Patent Literature 2 as in the XEX conversion equation. The conversion equation in this mode is expressed as follows. The conversion equation may be called XE conversion equation below.

$$TE\_K((N,i,j),X)=E\_K(X \text{ xor } mask\_K(N,i,j)) \quad \text{Equation (5)}$$

The XE conversion equation in Equation (5) is applied thereby to make a calculation corresponding to Y=F((N, i, j), X). A specific method for calculating mask_K(N, i, j) may employ the following method, for example.

$$mask\_K(N,i,j)=2^i 3^{(j-1)} L, \text{ where } L=E\_K(N) \quad \text{Equation (6)}$$

Herein, $2^i$ or $3^j$ denotes a power operation assuming 2 or 3 as a constant over a finite field $GF(2^n)$, and $2^i 3^j L$ denotes multiplication by $(2^i 3^j)$ assuming L as an element over the finite field $GF(2^n)$. FIG. 5 is an explanatory diagram schematically illustrating an example in which a pseudo random function with two input variables used for the present exemplary embodiment is realized by use of the XEX mode of block encryption. FIG. 5 illustrates an exemplary pseudo random function with two input variables realized in the above method. FIG. 6(*a*) is an explanatory diagram schematically illustrating an exemplary processing flow of the entire encryption processing according to the present exemplary embodiment when a pseudo random function with two input variables is realized by use of the XEX mode of block encryption.

Herein, L is L=E_K(N) as indicated in the where clause in Equation (6). Therefore, each time N is defined, E_K may be operated once. When L does not change and i or j sequentially changes, $B=2^i 3^j L$ can be efficiently calculated by use of the past calculation results, and thus L=E(N) is first found, and then the amount of calculations can be regarded as almost Y=E(B xor X). Additionally, a constant over the finite field $GF(2^n)$ may be set in various systems using the XEX mode described in Non-Patent Literature 2.

The XE conversion equation is different from the XEX conversion equation used in the OCB system in that mask_K output is not added to the outside since the OCB system requires the decode function TD_K of TE_K while the processing can be performed by only TE_K according to the present invention.

In addition to the XEX mode, Tweakable block encryption described in the literature "Kazuhiko Minematsu, "Improved Security Analysis of XEX and LRW Modes.", selected Areas in Cryptography 2006, p. 96-113." (Non-Patent Literature 4), or encryption function Threefish of Tweakable block encryption described in the literature "Niels ferguson, et al., "The Skein Hash Function Family.", [online] 2008, Internet <URL: http://www.skein-hash.info/sites/default/files/skein1.1.pdf">" (Non-Patent Literature 5) may be employed.

A keyed hash function such as HMAC may be employed for F_K(*, *) as other realization example. In this case, Y=F_K((N, i, j), X) may be calculated by performing appropriate lossless encoding on (N, i, j) and then coupling with X to be input of HMAC.

Figure 7:
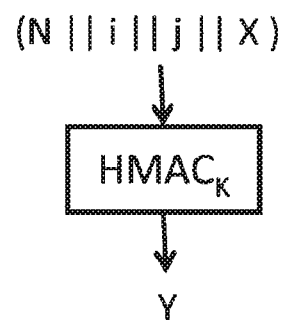
FIG. 7 It depicts an explanatory diagram schematically illustrating other example in which a pseudo random function with two input variables is realized.

For example, the variables N, i, j used for the auxiliary sequence may be expressed in binary with a proper fixed length (such as 128-bit) and coupled. FIG. 7 is an explanatory diagram schematically illustrating an example in which a pseudo random function with two input variables used in the present exemplary embodiment is realized by use of a keyed hash function. FIG. 7 illustrates an exemplary pseudo random function with two input variables realized in the above method. The symbol "||" in FIG. 7 denotes bit coupling. The input X and the auxiliary input (N, i, j) are output HMAC_K(N||i||j||X).

Figure 5:
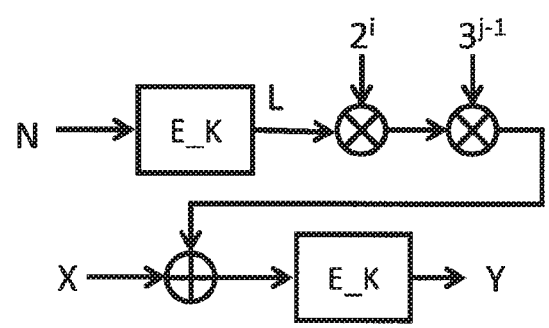
FIG. 5 It depicts an explanatory diagram schematically illustrating an example in which a pseudo random function with two input variables is realized.
Figure 6:
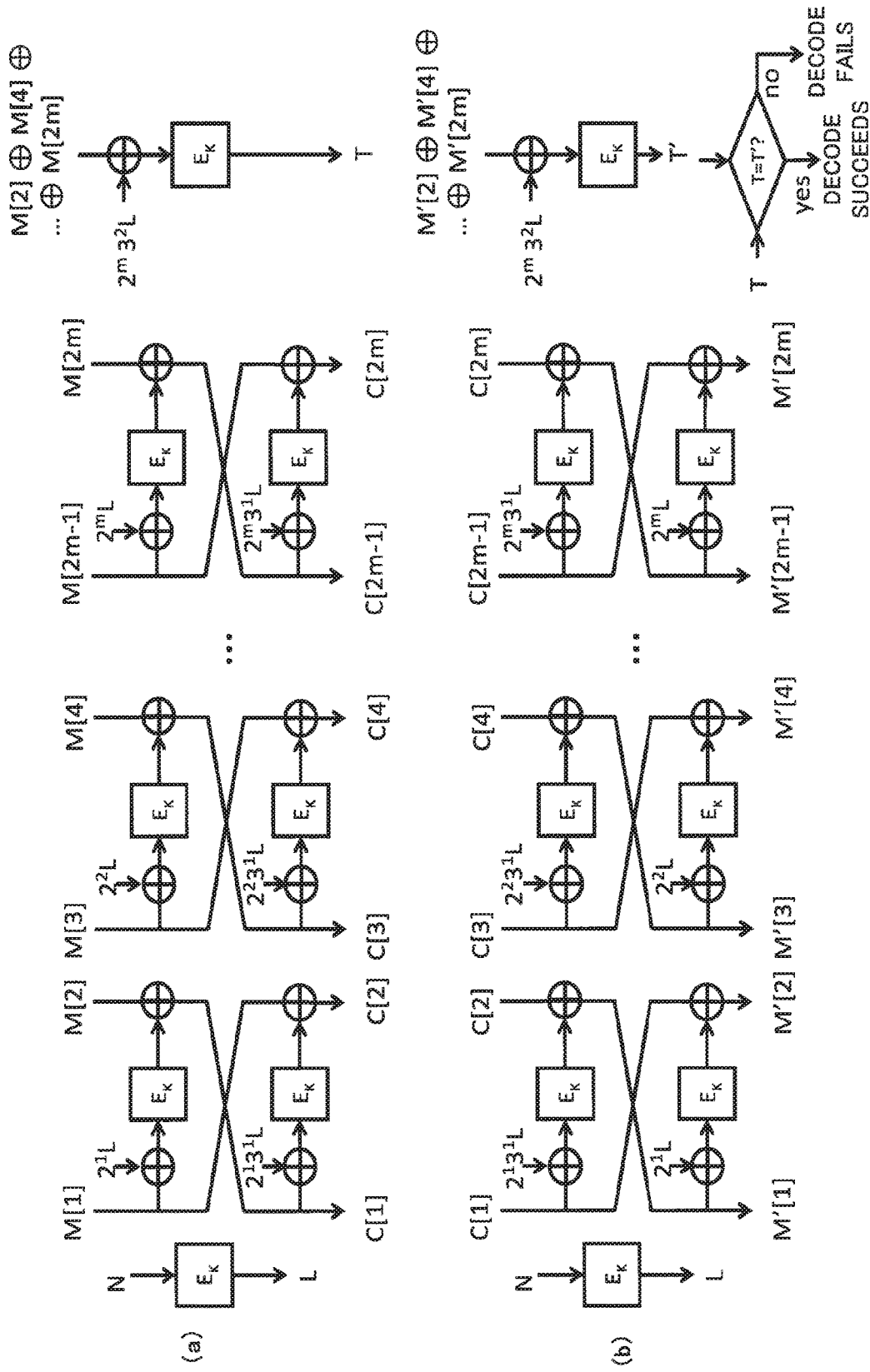
FIG. 6 It depicts (a) an explanatory diagram schematically illustrating an exemplary processing flow of an entire encryption processing with a pseudo random function using a block encryption XEX mode, and (b) an explanatory diagram schematically illustrating an exemplary processing flow of an entire decode processing with a pseudo random function using a block encryption XEX mode.

F_K(*, *) can be realized by use of HMAC_K instead of E_K illustrated in FIG. 5, for example.

The above processing is performed on i=1, . . . , m, and the resultant C=(C[1], . . . , C[2m]) is an encrypted text.

The tag calculation means 104 is directed for performing the block processing in the dashed-dotted line in FIG. 1, and calculates an authentication tag for message authentication by use of an auxiliary sequence output by the auxiliary variable generation means 102 and an input plaintext.

The tag calculation means 104 according to the present exemplary embodiment first finds a plaintext checksum SUM used for generating an authentication tag by use of the even blocks M[2], M[4], . . . , M[2m] in the plaintext as follows. XOR in calculating SUM may be addition in any group, such as arithmetic addition.

$$SUM=M[2] \text{ xor } M[4] \text{ xor } \ldots \text{ xor } M[2m] \quad \text{Equation (7)}$$

That is, a sum of all the even blocks M[2], M[4], . . . , M[2m] in the plaintext is found to be SUM. Then, the processing expressed in Equation (2) is performed on the found plaintext checksum by use of the pseudo random function F_K(*, *) with two input variables and the auxiliary sequence (N, m, 3) for generating an authentication tag, thereby finding an authentication tag T.

The output means 105 outputs the encrypted text C=(C[1], ..., C[2m]) output by the two-round Feistel encryption means 103, and the authentication tag T output by the tag calculation means 104. The output means 105 may output to an upper-level application which requests encryption, or may output to a communication path via a communication device or the like, for example. Further, it may output to a computer display or printer.

The decode means 20 provided in the decode device 200 will be described below. The decode means 20 has an input means 201, an auxiliary variable generation means 202, a two-round Feistel decode means 203, a decode examination tag calculation means 204, a determination means 205, and an output means 206.

The input means 201 inputs an encrypted text C to be decoded, an initial vector N, and an authentication tag T associated with the encrypted text. Similarly to the encryption means 10, it will be assumed below that an encrypted text C=(C[1], ..., C[2m]) having a plurality of blocks is input. The initial vector N is assumed to have n bits for simplicity, but if it is shorter, appropriate padding is performed, or a pseudo random function with n-bit output is additionally applied to reduce to n bits.

The auxiliary variable generation means 202 generates an auxiliary variable given to a pseudo random function in the decode processing based on the information on the initial vector N and a length of the encrypted text C. According to the present exemplary embodiment, it outputs the same auxiliary variable as the auxiliary variable generation means 102 in the encryption means 10.

The two-round Feistel decode means 203 corresponds to each block in a dashed line in FIG. 2, and decodes the encrypted text C by dividing it in units of two blocks and by use of the auxiliary sequences output by the auxiliary variable generation means 202 and the pseudo random function F_K(*, *) with two input variables. Herein, the pseudo random function F_K(*, *) with two input variables used by the two-round Feistel decode means 203 is the same as F_K(*, *) used by the two-round Feistel encryption means 103 in the encryption means 10.

The two-round Feistel decode means 203 processes the encrypted text chunk CC[i] for each i=1, ..., m as in Equation (3), for example, thereby acquiring the decoded plaintext chunk MC'[i]=(M'[2i−1], M'[2i]).

The above processing is performed on each i so that the resultant M'=(M'[1], ..., M'[2m]) is decoded into the plaintext.

The decode examination tag calculation means 204 corresponds to the block in a dashed-dotted line in FIG. 2, and calculates a decode examination authentication tag T' for examining a decode result by use of the auxiliary sequence output by the auxiliary variable generation means 202 and the plaintext M' decoded by the two-round Feistel decode means 203. Herein, the pseudo random function F_K(*, *) with two input variables used by the decode examination tag calculation means 204 is the same as F_K(**, *) used by the tag calculation means 104 in the encryption means 10.

The decode examination tag calculation means 204 first finds a plaintext checksum SUM' for decode examination using the decoded plaintext M' by use of the even blocks M'[2], M'[4], ..., M'[2m] in the decoded plaintext as follows.

$$SUM' = M'[2] \text{ xor } M'[4] \text{ xor } \ldots \text{ xor } M'[2m] \quad \text{Equation (8)}$$

That is, a sum of all the even blocks M'[2], M'[4], ..., M'[2m] in the decoded plaintext is found to be SUM'. Then, the processing indicated in Equation (4) is performed on the found plaintext checksum SUM' for decode examination by use of the pseudo random function F_K(*, *) with two input variables, and the auxiliary sequence (N, m, 3) for generating an authentication tag, thereby finding an authentication tag T'. XOR in calculating SUM may be addition in any group, such as arithmetic addition.

FIG. 6(b) is an explanatory diagram schematically illustrating an exemplary processing flow of the entire decode processing according to the present exemplary embodiment when a pseudo random function with two input variables is realized by use of the XEX mode of block encryption. Also in the example illustrated in FIG. 6(b), it can be seen that the decoded plaintext M' and the decode examination authentication tag T' can be acquired by the same processing as the encryption processing illustrated in FIG. 6(a) only by changing a parameter given to the pseudo random function with two input variables from the outside.

The determination means 205 compares the input authentication tag T with the decode examination authentication tag T' generated by the decode examination tag calculation means 204, and when they match, determines that the decode has succeeded assuming that the decoded plaintext M'=(M'[1], ..., M'[2m]) output by the two-round Feistel decode means 203 is correct. On the other hand, when T' and T are different from each other, it is determined that the decode has failed assuming that (N, C, T) input by the input means 201 is altered.

When the determination means 205 determines that the decode has succeeded as a result of the determination, the output means 206 outputs the decoded plaintext M'=(M'[1], ..., M'[2m]). On the other hand, when it is determined that the decode has failed, the decoded plaintext M'=(M'[1], ..., M'[2m]) is not output but an error indicating a decode error is output. The result is output to an upper-level application, a communication path, a display device, a printer, or the like.

According to the present exemplary embodiment, the input means 101 and the input means 201 are realized by various input devices such as keyboard, mouse or network interface unit provided in the device, and their control units. Further, the output means 105 and the output means 206 are realized by various output devices such as display device, device interface unit with printer, or network interface unit provided in the device, and their control units. The auxiliary variable generation means 102, the auxiliary variable generation means 202, the two-round Feistel encryption means 103, the two-round Feistel decode means 203, the tag calculation means 104, the decode examination tag calculation means 204, and the determination means 205 are realized by the CPU operating according to a program provided in the device, for example.

Though not illustrated, the encryption means 10 and the decode means 20 include a control means for controlling the encryption processing or the decode processing such as calling each means as appropriate.

Figure 8:
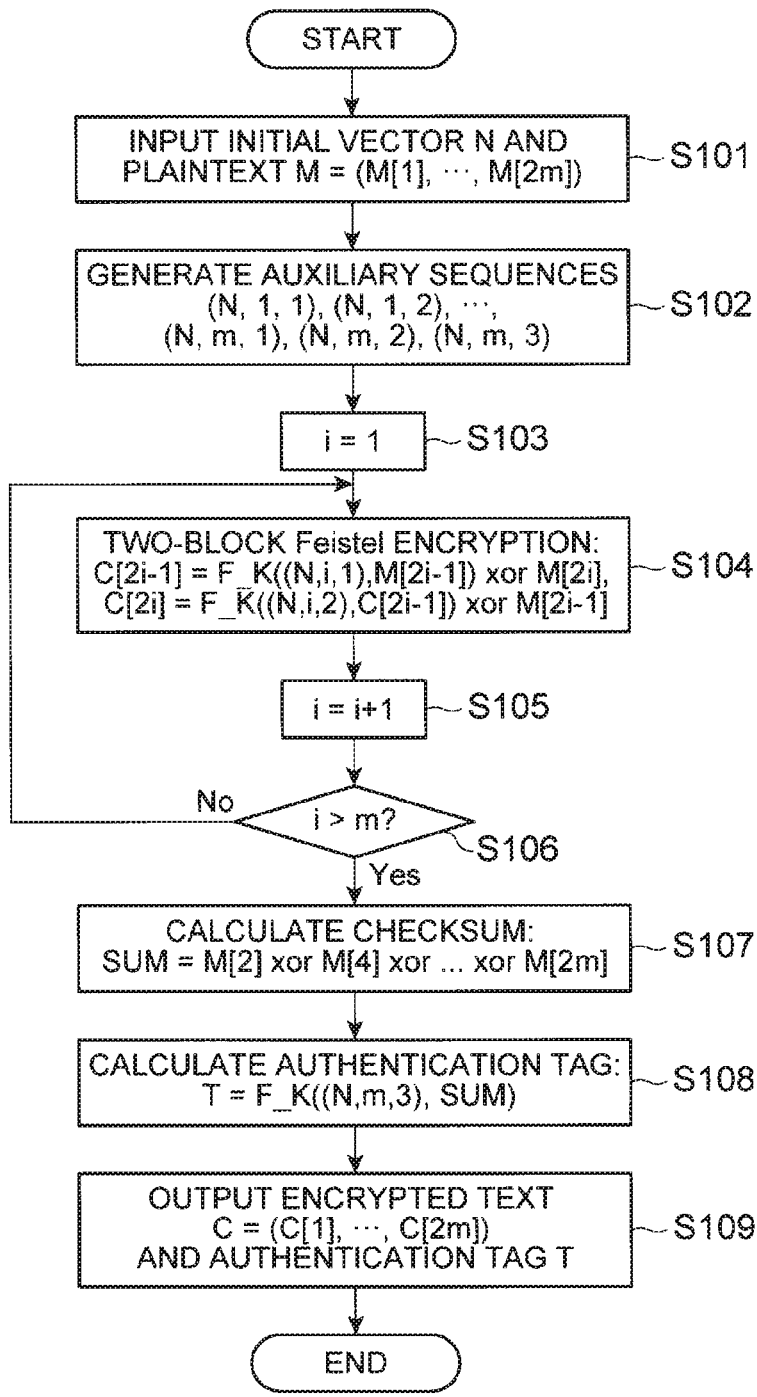
FIG. 8 It depicts a flowchart illustrating an exemplary encryption operation of an authenticated encryption system according to a first exemplary embodiment.
Figure 9:
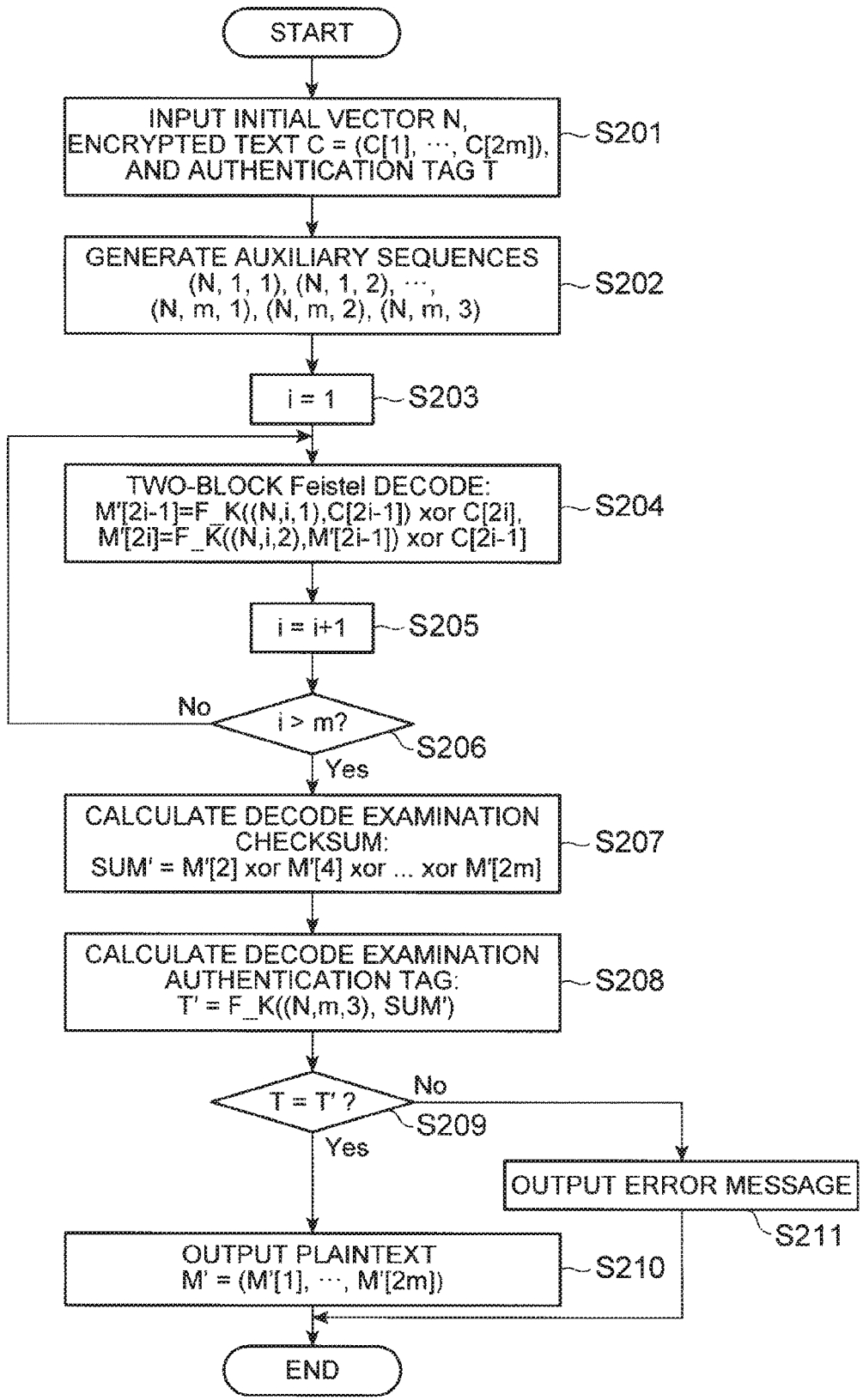
FIG. 9 It depicts a flowchart illustrating an exemplary decode operation of the authenticated encryption system according to the first exemplary embodiment.

The operations according to the present exemplary embodiment will be described below. FIG. 8 and FIG. 9 are the flowcharts illustrating exemplary operations of the authenticated encryption system according to the present exemplary embodiment. FIG. 8 is a flowchart illustrating an exemplary encryption operation, and FIG. 9 is a flowchart illustrating an exemplary decode operation.

The encryption operation according to the present exemplary embodiment will be first described with reference to FIG. 8. In the example illustrated in FIG. 8, the input means 101 first inputs a plaintext M=(M[1], ..., M[2m]) having even numbers of blocks to be encrypted, and an initial vector N (step S101).

The auxiliary variable generation means 102 then generates auxiliary sequences based on the information on the initial vector N and a length of the plaintext M (step S102). In the present example, assuming 2m divided blocks, (N, 1, 1,), (N, 1, 2), (N, 2, 1), (N, 2, 2), ..., (N, m−1, 1), (N, m−1, 2), (N, m, 1), (N, m, 2), (N, m, 3) are output. All the auxiliary sequences do not need to be generated at one time, and if which auxiliary sequence to employ is previously determined, an auxiliary sequence depending on an encryption function may be generated and output each time the encryption function is called.

The two-round Feistel encryption means 103 then divides the plaintext M in units of two blocks, and conducts encryption by use of the auxiliary sequences generated by the auxiliary variable generation means 102 and a predetermined pseudo random function F_K(*, *), thereby finding an encrypted text C=(C[1], . . . , C[2m]) (steps S103 to S106). After first initializing i at i=1 (step S103), for example, the two-round Feistel encryption means 103 may repeatedly perform the Feistel encryption processing in units of two blocks or the processing of executing Equation (1) (step S104) on the plaintext chunk MC[i]=(M[2i−1], M[2i]) indicated by i until++i>m is met.

The tag calculation means 104 then calculates a plaintext checksum SUM by use of the even blocks in the plaintext M (step S107), and calculates an authentication tag T by use of the resultant SUM and the auxiliary sequence (N, m, 3) for generating an authentication tag (step S108).

Finally, the output means 105 outputs the resultant encrypted text C and the tag T (step S109).

The decode operation according to the present exemplary embodiment will be described below with reference to FIG. 9. In the example illustrated in FIG. 9, the input means 201 first inputs an encrypted text C=(C[1], . . . , C[2m]) with even numbers of blocks to be decoded, an initial vector N, and an authentication tag T (step S201).

The auxiliary variable generation means 202 then generates auxiliary sequences based on the information on the initial vector N and a length of the encrypted text C (step S202). In the present example, assuming 2m divided blocks, (N, 1, 1), (N, 1, 2), (N, 2, 1), (N, 2, 2), ..., (N, m−1, 1), (N, m−1, 2), (N, m, 1), (N, m, 2), (N, m, 3) are output. All the auxiliary sequences do not need to be generated at one time, if which auxiliary sequence to employ is previously determined, an auxiliary sequence depending on an encryption function may be generated and output each time the encryption function is called.

The two-round Feistel decode means 203 then divides the encrypted text C in units of two blocks, and decodes it by use of the auxiliary sequences generated by the auxiliary variable generation means 202 and a predetermined pseudo random function F_K(*, *), thereby finding a decoded plaintext M'=(M'[1], . . . , M'[2m]) (steps S203 to S206). After first initializing i at i=1 (step S203), for example, the two-round Feistel decode means 203 may repeatedly perform the Feistel decode processing in units of two blocks or the processing of executing Equation (3) (step S204) on the encrypted text chunk CC[i]=(C[2i−1], C[2i]) indicated by i until ++i>m is met.

The decode examination tag calculation means 204 then calculates a plaintext checksum SUM' for decode examination by use of the decoded plaintext M' (step S207), and calculates a decode examination authentication tag T' by use of the resultant SUM' and the auxiliary sequence (N, m, 3) for generating an authentication tag (step S208).

The determination means 205 then compares the input authentication tag T with the decode examination authentication tag T' (step S209), and when they match, determines that decode has succeeded, and when they do not match, determines that the decode has failed.

Finally, the output means 206 outputs the decoded plaintext M' or an error message based on a determination result of the determination means 205. The output means 206 outputs the decoded plaintext M' when the decode has succeeded (step S210), and outputs an error message when the decode has failed (step S211) as a result of the determination by the determination means 205.

Figure 10:
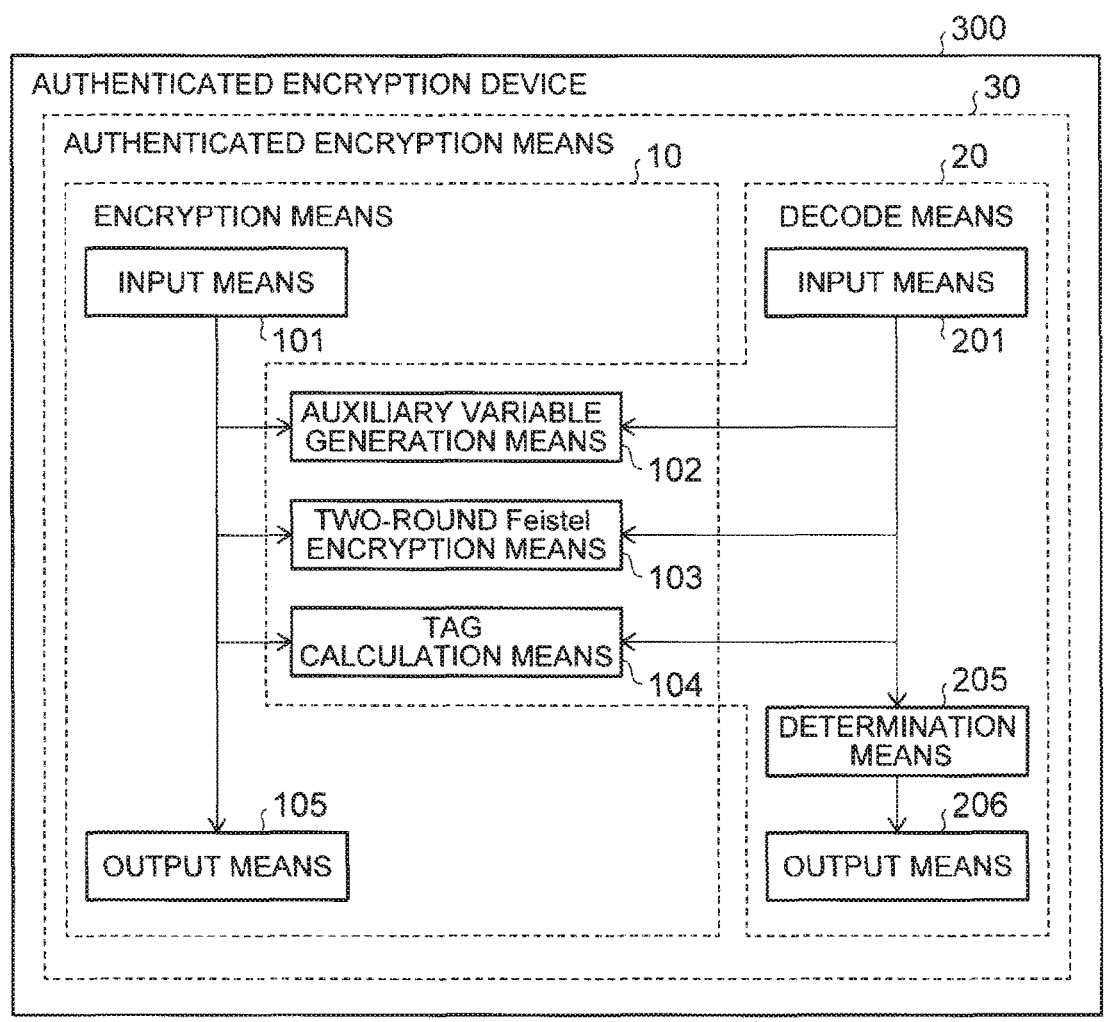
FIG. 10 It depicts a block diagram illustrating other exemplary structure of the authenticated encryption system.

There has been described above the case in which the encryption device and the decode device are realized by different devices, but as illustrated in FIG. 10, one device may include both the encryption means 10 and the decode means 20. In this case, an authenticated encryption means 30 including the encryption means 10 and the decode means 20 is provided, and in the authenticated encryption means 30, the decode means 20 may employ the auxiliary variable generation means 102, the two-round Feistel encryption means 103, and the tag calculation means 104 in the encryption means 10 instead of the auxiliary variable generation means 202, the two-round Feistel decode means 203, and the decode examination tag calculation means 204. Also when one device includes both the encryption means 10 and the decode means 20, each means may be separately mounted on a plurality of devices.

When the encryption means 10 and the decode means 20 share the auxiliary variable generation means 102, a call originator may be configured to designate an initial vector or length, for example. Similarly, when the two-round Feistel encryption means 103 is shared, a call originator may be configured to designate input into the upper pseudo random function F_K(*, *) with two input variables and input into the lower pseudo random function F_K(*, *) with two input variables, for example. Similarly, when the tag calculation means 104 is shared, a call originator may be configured to designate a plaintext checksum, for example.

As described above, according to the present exemplary embodiment, high-speed and compact authenticated encryption can be realized. This is because the authenticated encryption system according to the present invention conducts encryption and decode by calling a pseudo random function F_K(*, *) with two input variables S+1 times for a plaintext with S blocks.

For example, when an encryption function E(*) of block encryption is employed, the pseudo random function F_K(*, *) with two input variables can be realized by converting the encryption function E into the encryption function TE(*, *) for Tweakable block encryption, but when the E→TE conversion system is employed, the encryption function E(*) of block encryption is called only S+h times so that both encryption and decode can be realized.

On the other hand, the encryption function needs to be called 2×2m or more times in the existing two-pass authenticated encryption system. In the OCB system as one-pass authenticated encryption system, the number of times of call is almost as many as S+2 to S+3 times according to the present invention, but the decode function of block encryption is required in the decode processing, and thus an increase in ROM/RAM use in software mounting or circuit scale in hardware mounting is caused.

With the authenticated encryption system according to the present invention, the parallel processings are completely possible in units of two blocks, thereby realizing higher speed in software mounting or hardware mounting in the multi-core CPU.

Second Exemplary Embodiment

The authenticated encryption system according to a second exemplary embodiment is such that an object to be encrypted or decoded has even numbers of blocks and a length of the last block is less than n bits. The basic structure is the same as in the first exemplary embodiments, and thus only the differences will be described below.

In the following examples, assuming one block having n bits, a bit length s of the last block M[2m] in a plaintext having even blocks is assumed at s<n.

In the present exemplary embodiment, a second auxiliary sequence for generating an authentication tag will be newly defined. In the following example, (N, m, 4) is newly defined.

In the Feistel encryption processing and the Feistel decode processing in units of two blocks, an m-th chunk is processed as follows. An i=1, . . . , m−1-th chunk may be similarly processed as in the first exemplary embodiment.

At first, the encryption processing applies the pseudo random function F_K(*, *) with two input variables which is given the auxiliary sequence (N, m, 1) to a plaintext block M[2m−1] as an odd block in an m-th plaintext chunk. Then, the resultant output is assumed as intermediate output Z, and XOR of an s-bit binary sequence Z_s in which s bits are taken out of a fixed portion in the intermediate output z, and a plaintext block M[2m] as even block in the m-th plaintext chunk is taken, thereby finding an encrypted text block C_s[2m] as even block in an m-th encrypted text chunk. C_s[*] indicates that the size of the corresponding encrypted text block is s bits.

Further, s→n bit padding is performed on the thus-obtained s-bit encrypted text block C_s[2m], and the pseudo random function F_K(*, *) with two input variables which is given the auxiliary sequence (N, m, 2) is applied to the resultant C_n[2m], and then XOR with the plaintext block M[2m−1] as odd block in the m-th plaintext chunk is taken, thereby finding an encrypted text block C[2m−1] as odd block in the m-th encrypted text chunk. According to the present exemplary embodiment, the m-th encrypted text chunk CC[m]=(C[2m−1], C_s[2m]) is acquired in this way. An exemplary processing of acquiring an m-th encrypted text chunk according to the present exemplary embodiment is expressed as follow.

$$C\_s[2m]=\text{cut}\_s(Z)\text{ xor }M[2m],$$

$$C[2m-1]=F\_K((N,m,2),\text{pad}\_n(C\_s[2m])) \text{ xor } M[2m-1] \quad \text{Equation (9)}$$

where Z=F_K((N, m, 1), M[2m−1])

cut_s(A) indicates a processing of taking out s bits from a fixed portion in the binary sequence A. cut_s(A) may be msb_s(A), for example. msb_s(A) is a processing of taking out s bits from the uppermost level in the binary sequence A. Further, pad_n(A) indicates a processing of padding by use of a fixed bit sequence such that the binary sequence A has n bits. In the present example, padding is assumed as 10* padding. Assuming 10* padding, it is possible to prevent a sequence with a different length from having the same value after padding. Any form in which sequences with different lengths do not have the same value after padding may be employed not limited to the above example.

An authentication tag T can be found as follows. At first, a plaintext checksum SUM is found by use of the even blocks M[2], . . . , M[2(m−1)] of up to an m−1-th plaintext chunk, the intermediate output Z acquired in the above processing, and C_n[2m] in which an encrypted text block C_s[2m] as even block in the m-th encrypted text chunk acquired in the above processing is padded to n bits. As indicated in the following Equation (10), for example, it is found by taking their XOR.

$$\text{SUM}=M[2]\text{ xor }M[4]\text{ xor }\ldots\text{ xor }M[2m-2]\text{ xor }C\_n[2m]\text{ xor }Z \quad \text{Equation (10)}$$

The plaintext checksum SUM is different from the plaintext checksum generated according to the first exemplary embodiment in that "C_n[2m] xor Z" is used instead of M[2m].

A pseudo random function F_K((N, m, 4), *) with two input variables using the auxiliary variable (N, m, 4) is applied to the thus-acquired plaintext checksum SUM, thereby finding an authentication tag T.

Figure 11:
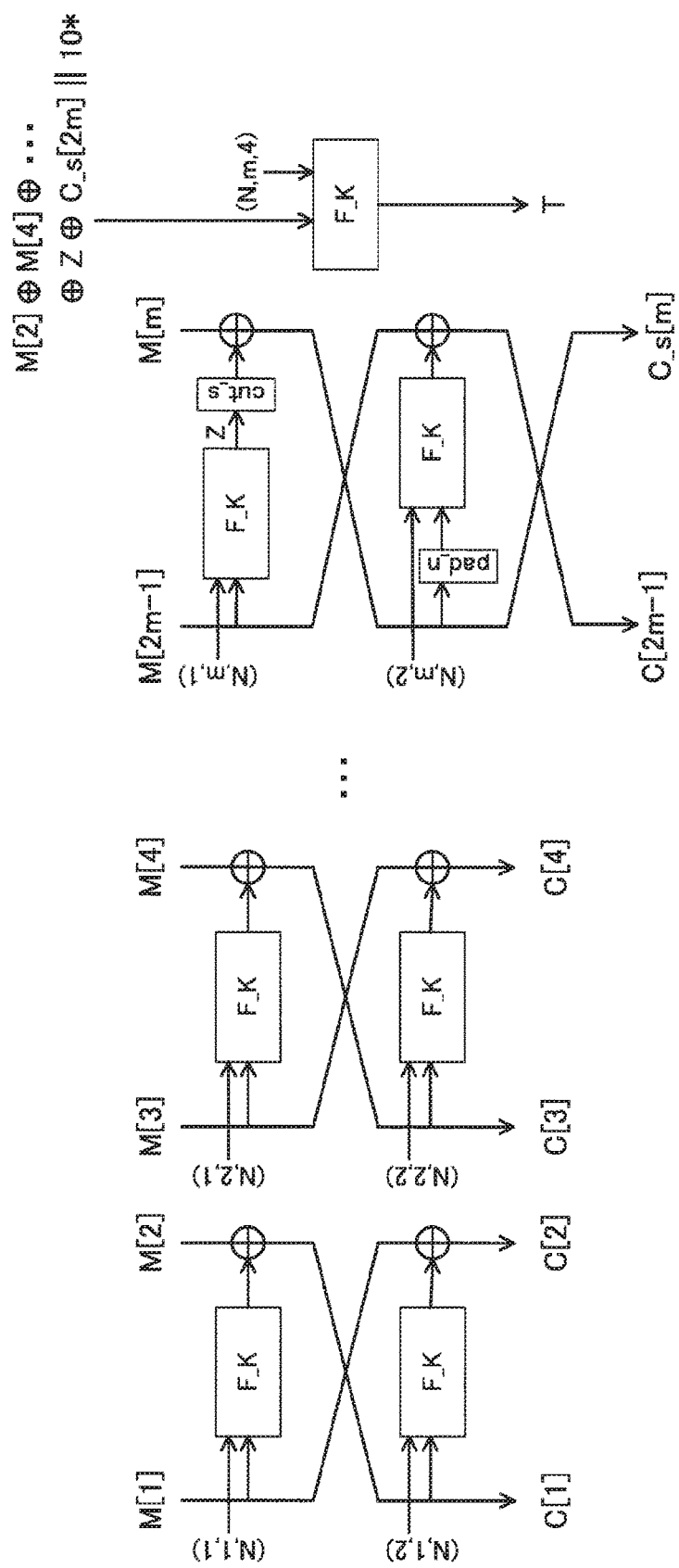
FIG. 11 It depicts an explanatory diagram schematically illustrating an exemplary processing flow of an entire encryption processing according to a second exemplary embodiment.

FIG. 11 is an explanatory diagram schematically illustrating an exemplary processing flow of an entire encryption processing according to the present exemplary embodiment. As illustrated in FIG. 11, the encryption processing according to the present exemplary embodiment is the same as in the first exemplary embodiment except the auxiliary sequence used for generating an authentication tag, the encryption processing on chunks including even blocks with a bit size of less than n, and the plaintext checksum calculation method. In FIG. 11, "C_s[2m]||10*" indicates a result obtained by performing 10* padding on C_s[2m].

The encryption means 10 according to the present exemplary embodiment may be such that when the last block M[2m] in a plaintext having even blocks has s(s<n) bits, the auxiliary variable generation means 102 generates the auxiliary sequences (N, 1, 1), (N, 1, 2), (N, 2, 1), (N, 2, 2), . . . , (N, m, 1), (N, m, 2), (N, m, 4), and may include a second two-round Feistel encryption means for performing the above processing on an m-th plaintext chunk and outputting an encrypted text chunk CC[m] and intermediate output Z, and a second tag calculation means for calculating an authentication tag T in the above processing. Alternatively, instead of providing the second two-round Feistel encryption means and the second tag calculation means, the two-round Feistel encryption means 103 and the tag calculation means 104 may switch and perform the operations according to the first exemplary embodiment and the above operations depending on a size of a plaintext.

In the decode processing, at first, s→n bit padding is performed on an s-bit encrypted text block C_s[2m] as even block in an m-th encrypted text chunk. Then, a pseudo random function F_K(*, *) with two input variables which is given the auxiliary sequence (N, m, 2) is applied to the n-bit encrypted text block C_n[2m] bits acquired by the padding. XOR of a result thereof and the encrypted text block C[2m−1] corresponding to an odd block in the m-th encrypted text chunk is taken, thereby finding a decoded plaintext block M'[2m−1] corresponding to the odd block in the m-th decoded plaintext chunk.

Then, the pseudo random function F_K(*, *) with two input variables which is given the auxiliary sequence (N, m, 1) is applied to the thus-acquired decoded plaintext block M'[2m−1]. Then, the resultant output is assumed as intermediate output Z' for decode, and XOR of an s-bit binary sequence Z_s' in which s bits are taken out of a fixed portion in the intermediate output Z' for decode, and the encrypted text block C_s[2m] as even block in the m-th encrypted text chunk is taken, thereby finding a decoded plaintext block M_s'[2m] corresponding to the even block in the m-th decoded plaintext chunk. M_s'[*] indicates that the size of the corresponding decoded plaintext block is s bits. According to the present exemplary embodiment, an m-th decoded plaintext chunk MC'[m]=(M'[2m−1], M_s'[2m]) is acquired in this way. An exemplary processing of acquiring an m-th decoded plaintext chunk according to the present exemplary embodiment is expressed as follows.

$$M'[2m-1]=F\_K((N,m,2),\text{pad}\_n(C\_s[2m]))\text{xor } C[2m-1],$$

$$M\_s'[2m]=\text{cut}\_s(Z')\text{xor } C\_s[2m] \quad \text{Equation (11)}$$

where $Z'=F\_K((N, m, 1), M'[2m-1])$

A decode examination authentication tag can be found as follows. At first, a plaintext checksum SUM' for decode examination using a decoded plaintext is found by use of the even blocks M'[2], ..., M'[2(m−1)] of up to an m−1-th decoded plaintext chunk, the intermediate output Z' for decode acquired in the above processing, and C_n[2m] obtained by padding the encrypted text block C_s[2m] as an even block in the input m-th encrypted text chunk to n bits. For example, it is found by taking their XOR as indicated in the following Equation (12).

$$SUM'=M'[2]\text{xor } M'[4]\text{xor }\ldots\text{xor } M'[2m-2]\text{xor } C\_n[2m]\text{xor } Z' \quad \text{Equation (12)}$$

The plaintext checksum SUM' is different from the plaintext checksum for decode examination generated according to the first exemplary embodiment in that "C_n[2m] xor Z'" is used instead of M'[2m].

A pseudo random function F_K((N, m, 4), *) with two input variables having the auxiliary sequence (N, m, 4) is applied to the thus-acquired plaintext checksum SUM' for decode examination, thereby calculating a decode examination authentication tag T'.

Figure 12:
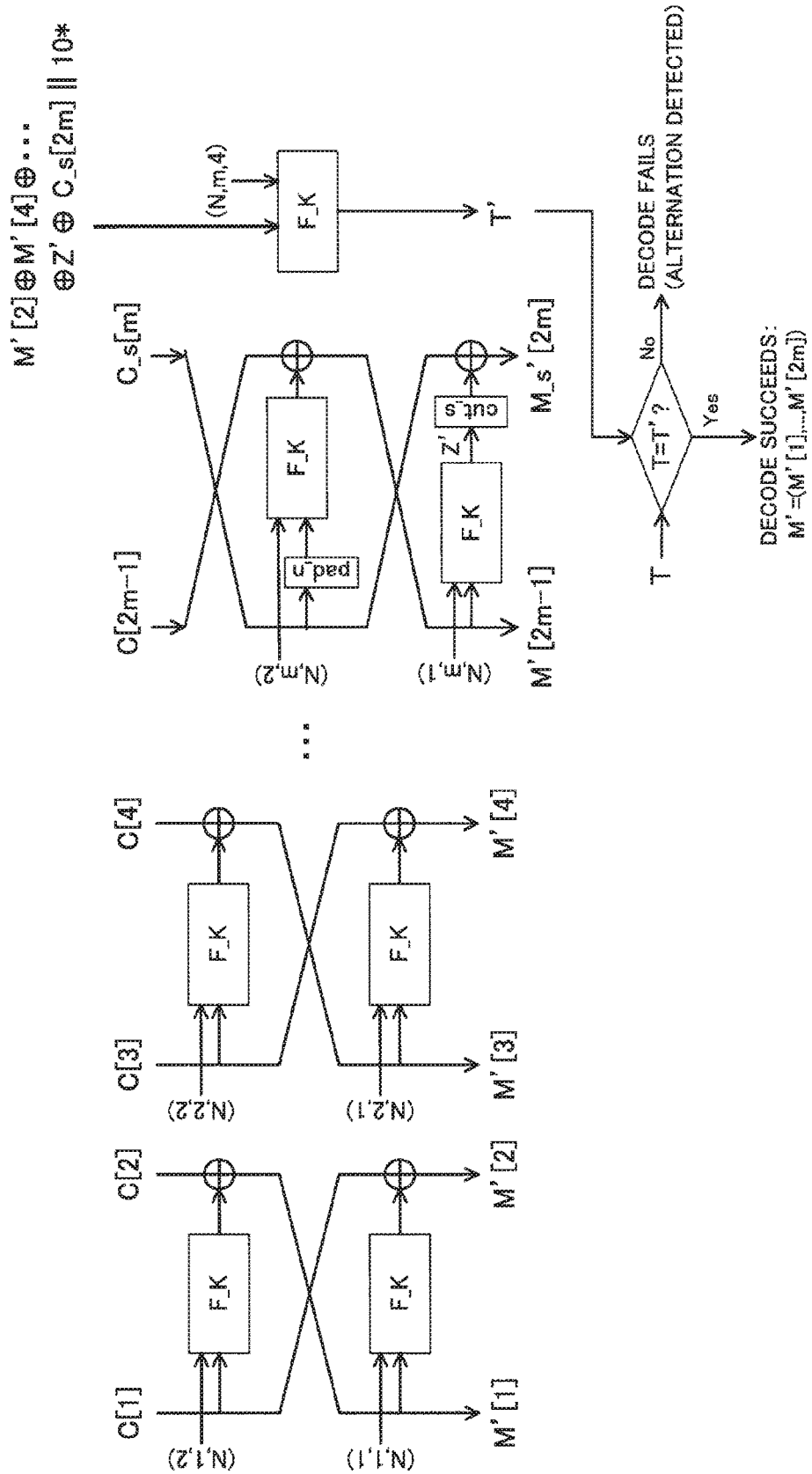
FIG. 12 It depicts an explanatory diagram schematically illustrating an exemplary processing flow of an entire decode processing according to the second exemplary embodiment.

FIG. 12 is an explanatory diagram schematically illustrating an exemplary processing flow of an entire decode processing according to the present exemplary embodiment. As illustrated in FIG. 12, the decode processing according to the present exemplary embodiment may be the same as in the first exemplary embodiment except the auxiliary sequence for generating an authentication tag, the decode processing on chunks including even blocks having a bit size of less than n, and the decode examination plaintext checksum calculation method. In FIG. 12, "C_s[2m]||10*" indicates a result obtained by performing 10* padding on C_s[2m].

The decode means 20 according to the present exemplary embodiment may include a second two-round Feistel decode means for, when the last block C[2m] in an encrypted text having even blocks is s (s<n) bits, outputting a plaintext chunk MC' decoded by performing the above processing on an m-th encrypted text chunk, and intermediate output Z' for decode, and a second decode examination tag calculation means for calculating a decode examination authentication tag T' in the above processing, and the auxiliary variable generation means 202 may be configured to generate the auxiliary sequences (N, 1, 1), (N, 1, 2), (N, 2, 1), (N, 2, 2), ..., (N, m, 1), (N, m, 2), (N, m, 4). Further, the two-round Feistel decode means 203 and the decode examination tag calculation means 204 previously described may be configured to switch and perform the operations according to the first exemplary embodiment and the above operations depending on a size of a plaintext.

Also in the present exemplary embodiment, the encryption processing and the decode processing on an m-th block are only switched between the upper stage and the lower stage, and thus, if the upper stage and the lower stage are separated into parts, they can be shared between the encryption processing and the decode processing. Also for generating an authentication tag, if a parameter to be given is designated at a call originator as in the first exemplary embodiment, it can be shared therebetween.

The present exemplary embodiment is also configured such that if auxiliary input and a key are defined, the plaintext chunks and the encrypted text chunks are in one-to-one correspondence and thus the last chunk can be correctly decoded. Further, the encryption function F_K itself does not need to be subjected to the inverse processing in the processings at individual rounds in the Feistel structure, and a decode examination authentication tag is found in the same method as the encryption processing also in the present exemplary embodiment, and thus the present exemplary embodiment is the same as the first exemplary embodiment in that the encryption function F_K itself does not need to be entirely subjected to the inverse processing.

Third Exemplary Embodiment

The authenticated encryption system according to a third exemplary embodiment is such that an object to be encrypted or decoded has odd numbers of blocks. The basic structure is the same as in the first exemplary embodiment, and thus only the differences will be described below.

According to the present exemplary embodiment, when the number of blocks in a plaintext is odd (2m−1) assuming one block having n bits, and a bit length s of the last block is s≤n, authenticated encryption is performed as follows.

The third and fourth auxiliary sequences for generating an authentication tag will be newly defined. In the following examples, (N, m, 5) and (N, m, 6) are newly defined. For a plaintext having odd blocks, the auxiliary sequence (N, m, 2) corresponding to the even block in the last chunk is not required.

In the Feistel encryption processing and the Feistel decode processing in units of two blocks, an m-th chunk is processed as follows. Additionally, i=1, ..., m−1-th chunk may be processed as in the first exemplary embodiment.

In the encryption processing, an n-bit binary sequence made of all zero is prepared, and a pseudo random function F_K(*, *) with two input variables which is given the auxiliary sequence (N, m, 1) is applied to the binary sequence. XOR of an s-bit binary sequence Z_s in which s bits are taken out of a fixed portion in the resultant output, and an s-bit plaintext block M_s[2m−1] as the last block in the plaintext as an odd block in an m-th plaintext chunk is taken, thereby finding an encrypted text block C_s[2m−1] corresponding to the odd block in the m-th encrypted text chunk or the last block in the encrypted text.

According to the present exemplary embodiment, an m-th encrypted text chunk CC[m]=(C_s[2m−1]) is acquired in this way. An exemplary processing of acquiring an m-th encrypted text chunk according to the present exemplary embodiment is expressed as follows.

$$C\_s[2m-1]=\text{cut}\_s(F\_K((N,m,1),0^\wedge n))\text{xor } M\_s[2m-1] \quad \text{Equation (13)}$$

When the size of the last block is s=n, cut_s( ) is omitted and the processing in the following Equation (14) is performed thereby to acquire CC[m]=(C[2m−1]).

$$C[2m-1]=F\_K((N,m,1),0^\wedge n)\text{xor } M[2m-1] \quad \text{Equation (14)}$$

An authentication tag T is found as follows. According to the present exemplary embodiment, if the size of the last block is s=n, a plaintext checksum SUM is found by use of the even blocks M[2], ..., M[2(m−1)] of up to an m−1-th plaintext chunk, and a plaintext block M[2m−1] as the last block. For example, it is found by taking their XOR as expressed in the following Equation (15).

$$\text{SUM}=M[2] \text{ xor } M[4] \text{ xor } \ldots \text{ xor } M[2m-2] \text{ xor } M[2m-1] \quad \text{Equation (15)}$$

On the other hand, when the size of the last block is s<n, a plaintext checksum SUM is found by use of the even blocks M[2], ..., M[2(m−1)] of up to an m−1-th plaintext chunk, and M_n[2m−1] obtained by padding the s-bit plaintext block M_s[2m−1] as the last block to n bits. For example, it is found by taking their XOR as expressed in the following Equation (16).

$$\text{SUM}=M[2] \text{ xor } M[4] \text{ xor } \ldots \text{ xor } M[2m-2] \text{ xor } \text{pad}\_n(M\_s[2m-1]) \quad \text{Equation (16)}$$

The plaintext checksum SUM is different from the plaintext checksum generated according to the first exemplary embodiment in that M_n[2m−1] (M[2m−1] or M_s[2m−1] is extended to n bits) is used instead of M[2m].

A pseudo random function F_K((N, m, 5), *) with two input variables having the auxiliary sequence (N, m, 5) is applied to the thus-acquired plaintext checksum SUM at s=n, and a pseudo random function F_K((N, m, 6), *) with two input variables having the auxiliary sequence (N, m, 6) is applied thereto at s<n, thereby finding an authentication tag T.

Figure 13:
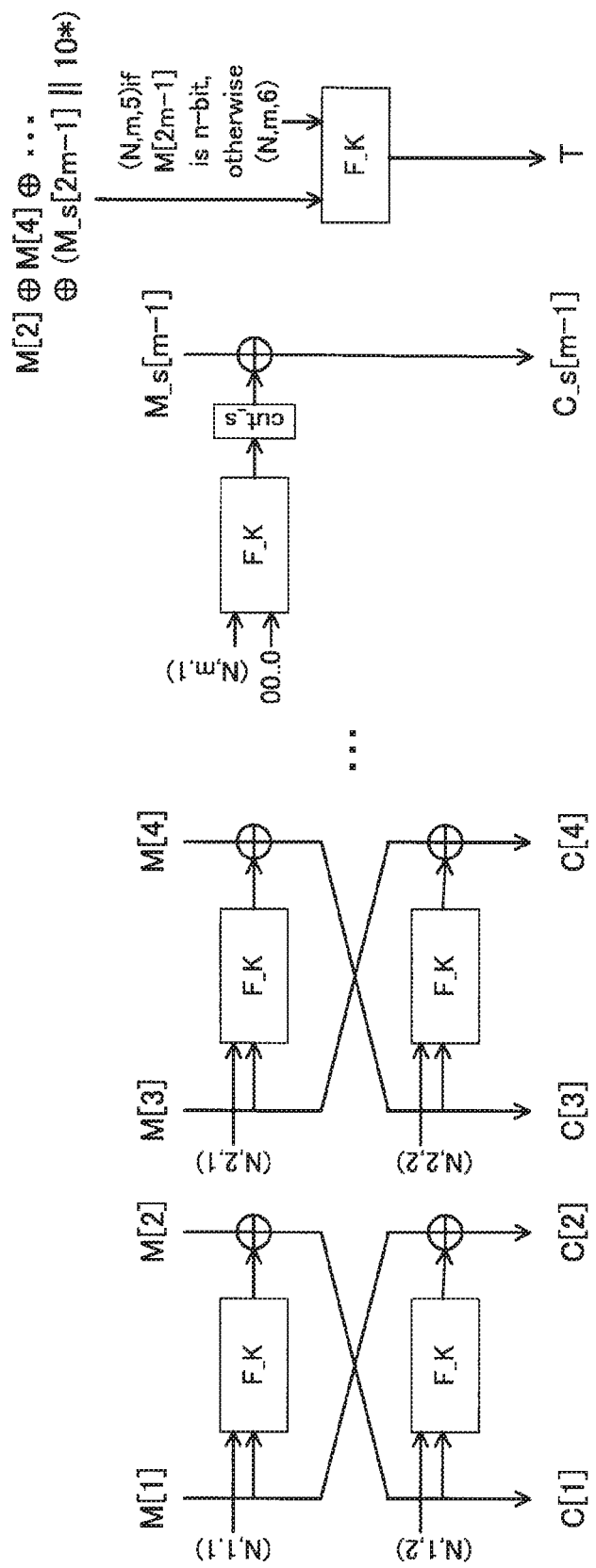
FIG. 13 It depicts an explanatory diagram schematically illustrating an exemplary processing flow of an entire encryption processing according to a third exemplary embodiment.

FIG. 13 is an explanatory diagram schematically illustrating an exemplary processing flow of an entire encryption processing according to the present exemplary embodiment. As illustrated in FIG. 13, the encryption processing according to the present exemplary embodiment is the same as in the first exemplary embodiment except the encryption processing on an m-th chunk and the authentication tag generation processing. In FIG. 13, "M_s[2m−1]||10*" indicates a result obtained by performing 10* padding on an s-bit plaintext block M_s[2m]. FIG. 13 illustrates the case in which the size of the last block is s<n, but in the case of s=n, cutting in the processing on an m-th block ("cut_s" in the Figure) and padding in the authentication tag generation processing ("||10*" in the Figure) may be omitted. In the case of s=n, M_s[m−1]=M[m−1] and C_s[2m−1]=C[2m−1] are established, and even if cut_s( ) or pad_n( ) is executed, no processing is substantially performed, and thus a problem is not particularly caused without omitting cut_s( ) or pad_n( ).

The encryption means 10 according to the present exemplary embodiment may be such that when a plaintext has 2m−1 blocks, the auxiliary variable generation means 102 generates the auxiliary sequences (N, 1, 1), (N, 1, 2), (N, 2, 1), (N, 2, 2), ..., (N, m, 1), (N, m, 5), (N, m, 6), and may include a one-round Feistel encryption means for performing the above processing on an m-th plaintext chunk and outputting an encrypted text chunk CC[m]=(C_s[2m−1]), and a third tag calculation means for calculating an authentication tag T in the above processing. Further, the two-round Feistel encryption means 103 and the tag calculation means 104 may be configured to switch and perform the operations according to the first exemplary embodiment and the above operations depending on a size of a plaintext instead of providing the one-round Feistel encryption means and the third tag calculation means. If the auxiliary variable generation means 102, the two-round Feistel encryption means 103, and the tag calculation means 104 are configured to switch and perform the operations according to the first exemplary embodiment and the operations according to the second exemplary embodiment depending on a size of a plaintext, any case with even numbers of blocks, odd numbers of blocks, or the last block having a size of less than n may be coped with.

Also in the decode processing, an n-bit binary sequence made of all zero is prepared, and a pseudo random function F_K(*, *) with two input variables which is given the auxiliary sequence (N, m, 1) is applied to the binary sequence. XOR of an s-bit binary sequence Z_s in which s bits are taken out of a fixed portion in the resultant output, and an s-bit encrypted text block C_s[2m−1] as an odd block in the m-th encrypted text chunk or the last block in the encrypted text is taken, thereby finding a decoded plaintext block M_s'[2m−1] corresponding to an odd block in the m-th decoded plaintext chunk or the last block in the decoded plaintext.

According to the present exemplary embodiment, an m-th decoded plaintext chunk MC''[m]=(M_s'[2m−1]) is acquired in this way. An exemplary processing of acquiring an m-th decoded plaintext chunk according to the present exemplary embodiment is expressed as follows.

$$M\_s'[2m-1]=\text{cut}\_s(F\_K((N,m,1),0^\hat{}n)) \text{ xor } C\_s[2m-1] \quad \text{Equation (17)}$$

When the size of the last block is s=n, cut_s( ) is omitted and the processing expressed in the following Equation (18) is performed thereby to acquire MC'[m]=(M'[2m−1]).

$$M'[2m-1]=F\_K((N,m,1),0^\hat{}n) \text{ xor } C[2m-1] \quad \text{Equation (18)}$$

A decode examination authentication tag T' can be found by replacing a plaintext in the encryption processing with a decoded plaintext. That is, when the size of the last block is s=n, a plaintext checksum SUM' for decode examination is found by use of the even blocks M'[2], ..., M'[2(m−1)] of up to an m−1-th decoded plaintext chunk, and a decoded plaintext block M'[2m−1] as the last block. It is found by taking their XOR as expressed in the following Equation (19), for example.

$$\text{SUM}'=M'[2] \text{ xor } M'[4] \text{ xor } M'[2m-2] \text{ xor } M'[2m-1] \quad \text{Equation (19)}$$

On the other hand, when the size of the last block is s<n, a plaintext checksum SUM' for decode examination is found by use of the even blocks M'[2], ..., M'[2(m−1)] of up to an m−1-th decoded plaintext chunk, and M_n'[2m−1] obtained by padding the s-bit plaintext block M_s'[2m−1] as the last block to n bits. For example, it is found by taking their XOR as expressed in the following Equation (20).

$$\text{SUM}'=M'[2] \text{ xor } M'[4] \text{ xor } M'[2m-2] \text{ xor } \text{pad}\_n(M\_s'[2m-1]) \quad \text{Equation (20)}$$

The plaintext checksum SUM' for decode examination is different from the plaintext checksum for decode examination generated according to the first exemplary embodiment in that M_n'[2m−1] (M'[2m−1] or M_s'[2m−1] is extended to n bits) is used instead of M'[2m].

A pseudo random function F_K((N, m, 5), *) with two input variables having the auxiliary sequence (N, m, 5) is applied to the thus-acquired plaintext checksum SUM' for decode examination at s=n, and a pseudo random function F_K((N, m, 6), *) with two input variables having the auxiliary sequence (N, m, 6) is applied thereto at s<n, thereby finding a decode examination authentication tag T'.

Figure 14:
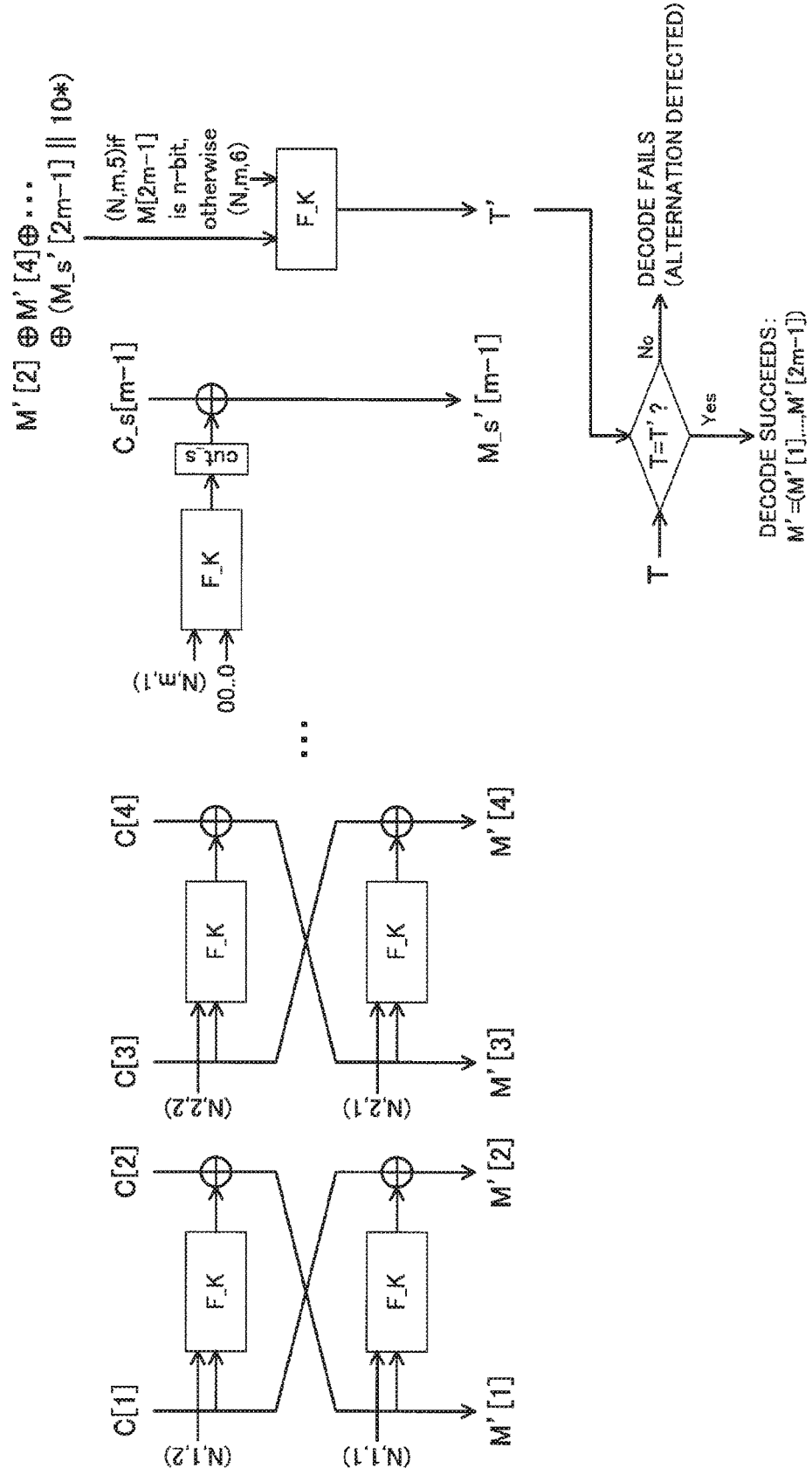
FIG. 14 It depicts an explanatory diagram schematically illustrating an exemplary processing flow of an entire decode processing according to the third exemplary embodiment.

FIG. 14 is an explanatory diagram schematically illustrating an exemplary processing flow of an entire decode processing according to the present exemplary embodiment. As illustrated in FIG. 14, the decode processing according to the present exemplary embodiment may be the same as in the first exemplary embodiment except the decode processing on an m-th encrypted text chunk and the decode examination authentication tag generation processing. In FIG. 14, "M_s'[2m−1]||10*" indicates a result obtained by performing 10* padding on an s-bit decoded plaintext block M_s'[2m−1]. FIG. 14 illustrates the case in which the size of the last block is s<n, but cutting in the processing on an m-th block ("cut_s" in the Figure) and padding in the authentication tag generation processing ("∥10*" in the Figure) may be omitted at s=n. At s=n, C_s[2m−1]=C[2m−1] and M_s'[m−1]=M'[m−1] are established, and even if cut_s( ) or pad_n( ) is executed, no processing is substantially performed, and thus a problem is not particularly caused without omitting cut_s( ) or pad_n( ).

The decode means 20 according to the present exemplary embodiment may be such that when an encrypted text has 2m−1 blocks, the auxiliary variable generation means 202 generates the auxiliary sequences (N, 1, 1), (N, 1, 2), (N, 2, 1), (N, 2, 2), . . . , (N, m, 1), (N, m, 5), (N, m, 6), and may include a one-round Feistel decode means for performing the above processing on an m-th encrypted text chunk and outputting a decoded plaintext chunk MC'[m]=(M_s'[2m−1]), and a third decode examination tag calculation means for calculating a decode examination authentication tag T' in the above processing. Alternatively, the two-round Feistel decode means 203 and the decode examination tag calculation means 204 may be configured to switch and perform the operations according to the first exemplary embodiment and the above operations depending on a size of an encrypted text instead of providing the one-round Feistel decode means and the third decode examination tag calculation means. If the auxiliary variable generation means 202, the two-round Feistel decode means 203, and the decode examination tag calculation means 204 are configured to switch and perform the operations according to the first exemplary embodiment and the operations according to the second exemplary embodiment depending on a size of an encrypted text, any case with even numbers of blocks, odd numbers of blocks, or the last block having a size of less than n may be coped with.

Also in the present exemplary embodiment, the encryption processing and the decode processing on an m-th block are different from each other in parameters to be given and are the same in the processing contents, and thus if a parameter to be given can be designated at a call originator, it can be shared therebetween as in the first exemplary embodiment. Further, for generating an authentication tag, if a parameter to be given can be designated at a call originator, it can be shared therebetween as in the first exemplary embodiment.

The present exemplary embodiment is also configured such that if auxiliary input and a key are defined, the plaintext chunks and the encrypted text chunks are in one-to-one correspondence and thus the last chunk can be correctly decoded. Further, the encryption function F_K itself does not need to be subjected to the inverse processing in the processings at individual rounds in the Feistel structure, and a decode examination authentication tag is found in the same method as the encryption processing also according to the present exemplary embodiment, and thus the encryption function F_K itself does not need to be subjected to the inverse processing as a whole as in the first exemplary embodiment and the second exemplary embodiment.

Figure 15:
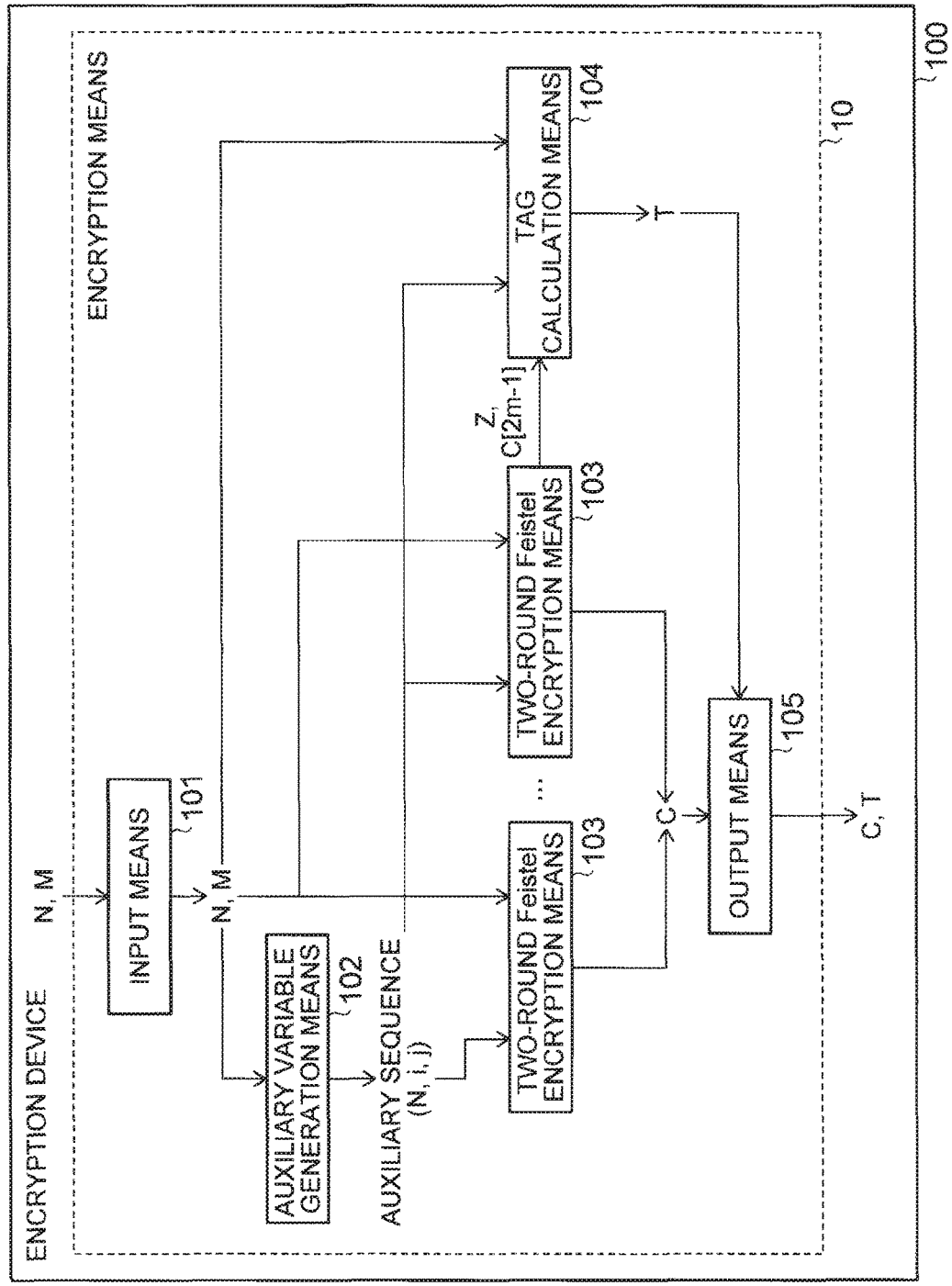
FIG. 15 It depicts a block diagram illustrating an exemplary structure of an encryption device 100 for parallel processings.
Figure 16:
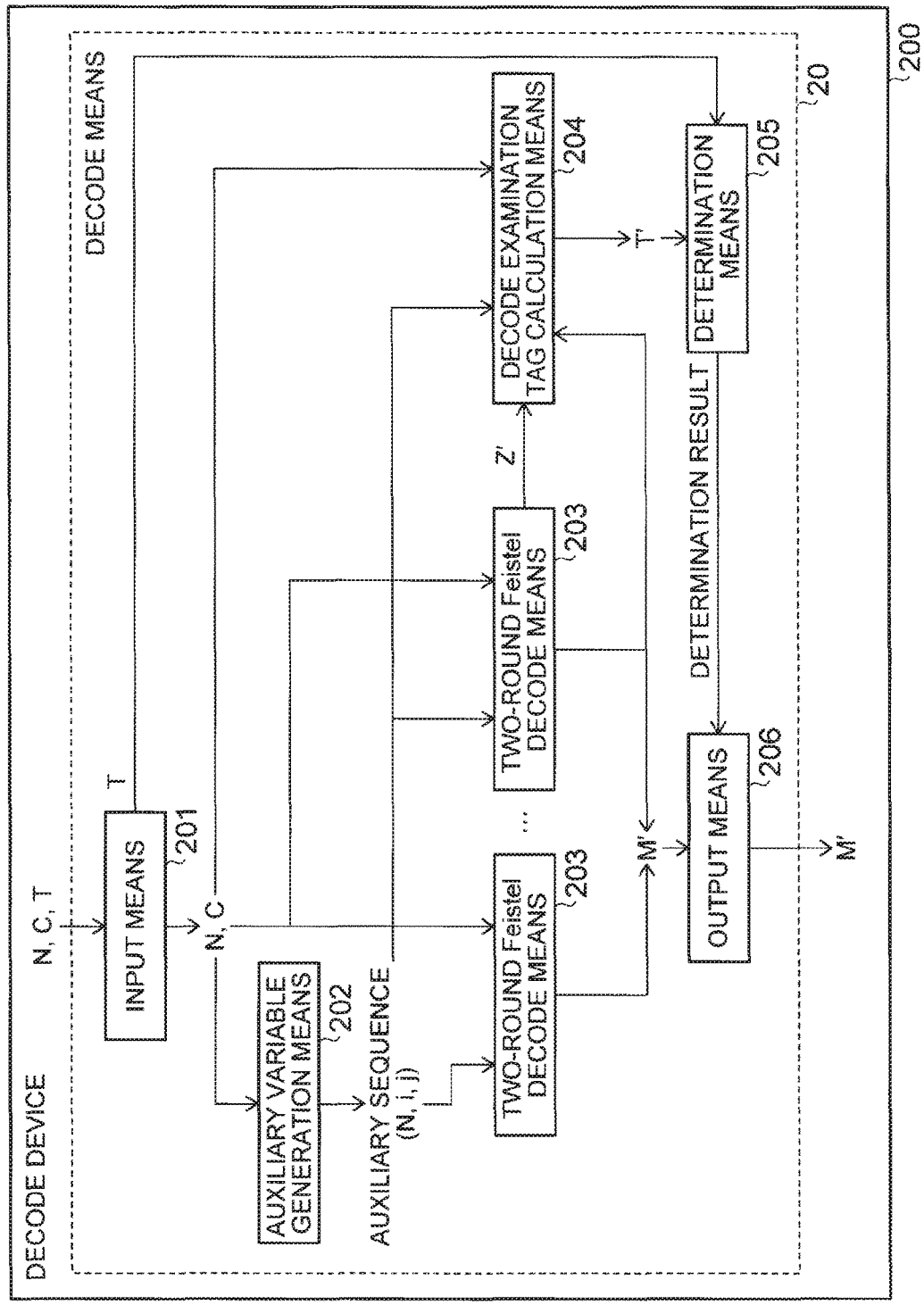
FIG. 16 It depicts a block diagram illustrating an exemplary structure of a decode device 200 for parallel processings.

FIG. 15 is a block diagram illustrating an exemplary structure of the encryption device 100 for parallel processings. FIG. 16 is a block diagram illustrating an exemplary structure of the decode device 200 for parallel processings. As illustrated in FIG. 15, a plurality of two-round Feistel encryption means 103 are provided thereby to perform the encryption processing on each plaintext chunk in units of two blocks in parallel. In FIG. 15, some of the two-round Feistel encryption means 103 operate as the second two-round Feistel encryption means or the one-round Feistel encryption means depending on a size of a plaintext. Further, the tag calculation means 104 operates as the second tag calculation means or the third tag calculation means depending on a size of a plaintext. Further, as illustrated in FIG. 16, a plurality of two-round Feistel decode means 203 are provided thereby to perform the decode processing on each encrypted text chunk in units of two blocks in parallel. In FIG. 16, some of the two-round Feistel decode means 203 operate as the second two-round Feistel decode means or the one-round Feistel decode means depending on a size of an encrypted text. Further, the decode examination tag calculation means 204 operates as the second decode examination tag calculation means or the third decode examination tag calculation means depending on a size of an encrypted text.

In order to cope with authenticated encryption with associated data (AEAD) according to each exemplary embodiment, a header H is added to input and then a pseudo random function g_K'(*) with any variable length input is prepared, and XOR of a generated authentication tag (T or T') and output from the pseudo random function g_K'(H) with any variable length input may be assumed as a final authentication tag (T2 or T2'). That is, in the encryption processing, the authentication tag T is found as described above, and then the final authentication tag T2 may be found as T2=T xor g_K'(H) by use of g_K'(*). Then, the encryption result may be assumed as (N, C, H, T2). In the decode processing, the decode examination authentication tag T' is found as described above, and then the final decode examination authentication tag T2'=T' xor g_K(H) is found by use of g_K'(*) to determine whether it matches the received T2.

Herein, K' is a key selected independently of the key of the pseudo random function F_K(*, *) with two input variables. In this case, the keys of the entire processing is a pair of (K, K').

The pseudo random function g_K' with variable length input can be realized by CMAC or HMAC, for example. CMAC or HMAC is an encryption function for reducing any input to fixed-length output by use of a key. For example, CMAC is configured of a chain processing called CBC MAC on each block (such as H[1], . . . , H[h]) in the header H, and a termination processing by use of a block function E_K' having a key K'.

As a specific example, when block encryption to be used employs an n-bit block, the processing:
Y[0]=00 . . . 0,
Y[i]=E_K'(H[1] xor Y[i−1]), for i=1, 2, . . . , (h−1)
Y[h]=E_K'(H[h] xor Y[i−1] xor 2*E_K'(00 . . . 0)), if H[h] is n-bit
Y[h]=E_K'((H[h]∥10*) xor Y[h−1] xor 4*E_K'(00 . . . 0)), if H[h] is less than n-bit, is performed. 2* and 4* denote a multiplication processing by a constant over a finite field.

Figure 17:
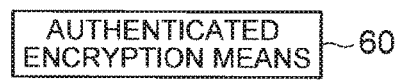
FIG. 17 It depicts a block diagram illustrating an exemplary minimum structure of an authenticated encryption device according to the present invention.

A minimum structure of the present invention will be described below. FIG. 17 is a block diagram illustrating an exemplary minimum structure of an authenticated encryption device according to the present invention. As illustrated in FIG. 17, the authenticated encryption device according to the preset invention includes an authenticated encryption means 60 as a minimum component.

In the authenticated encryption device illustrated in FIG. 17, the authenticated encryption means 60 applies the two-round Feistel structure in which an encryption function assigned with an auxiliary variable is used for a round function in units of two blocks to an input plaintext or encrypted text, thereby generating an encrypted text or decoded plaintext.

With the authenticated encryption device having the minimum structure, the encryption function is used only in one direction for the encryption processing and the decode processing, and thus it is possible to achieve one-pass and one-rate authenticated encryption capable of performing parallel processings and totally performing encryption and decode processings by only one encryption function.

Figure 18:
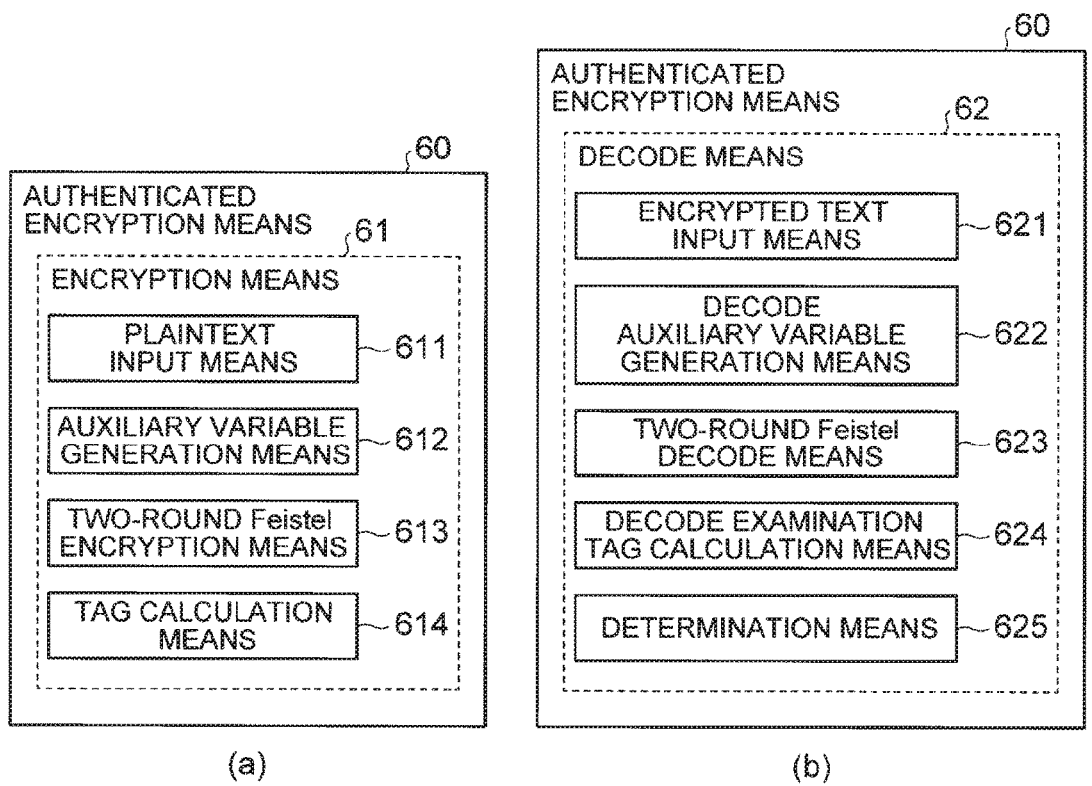
FIG. 18 It depicts a block diagram illustrating other exemplary structure of the authenticated encryption device according to the present invention.
Figure 19:
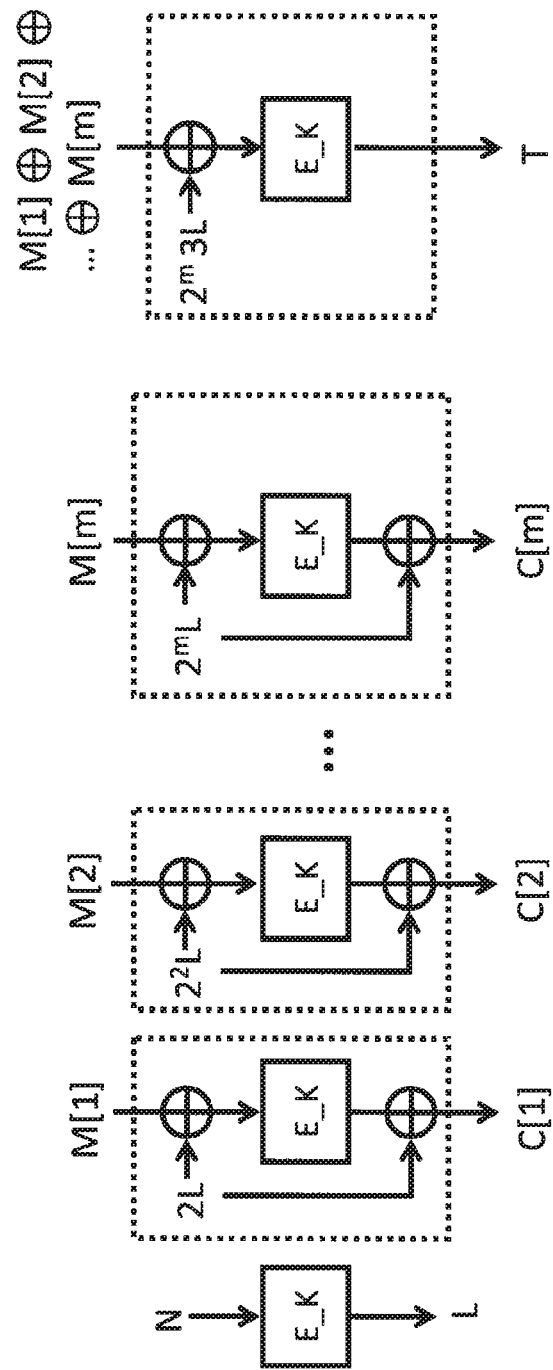
FIG. 19 It depicts an explanatory diagram schematically illustrating an exemplary processing flow of an entire encryption processing in the OCB system.
Figure 20:
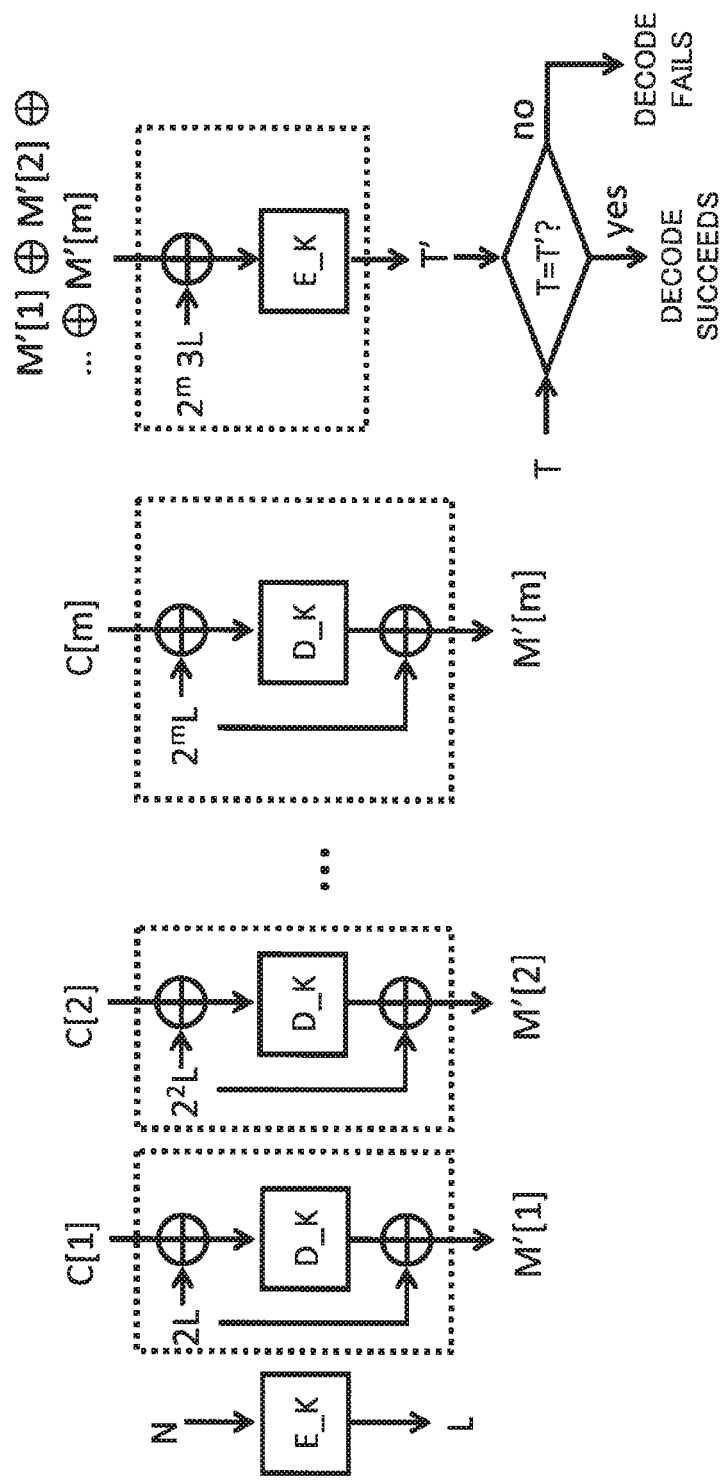
FIG. 20 It depicts an explanatory diagram schematically illustrating an exemplary processing flow of an entire decode processing in the OCB system.

FIGS. 18(a) and 18(b) are the block diagrams illustrating a more specific structure of the authenticated encryption means 60 by way of example, where FIG. 18(a) illustrates an exemplary structure of the authenticated encryption means 60 when the authenticated encryption device is assumed as an encryption device, and FIG. 18(b) illustrates an exemplary structure of the authenticated encryption means 60 when the authenticated encryption device is assumed as a decode device.

As illustrated in FIG. 18(a), the authenticated encryption means 60 may include an encryption means 61 (the encryption means 10, for example), and the encryption means 61 may have a plaintext input means 611, an auxiliary variable generation means 612, a two-round Feistel encryption means 613, and a tag calculation means 614.

The plaintext input means 611 (the input means 101, for example) inputs a plaintext to be encrypted and an initial vector.

The auxiliary variable generation means 612 (the auxiliary variable generation means 102, for example) generates an auxiliary variable to be given to each of the encryption functions based on the initial vector and a size of the input plaintext.

The two-round Feistel encryption means 613 (the two-round Feistel encryption means 103, for example) applies the two-round Feistel structure to each plaintext chunk when a plaintext is divided into chunks per two blocks, thereby generating encrypted text chunks corresponding to the plaintext chunks.

Assuming an initial vector N, a chunk index i, an i-th plaintext chunk $MC[i]=(M[i\_1], M[i\_2])$, a pair of auxiliary variables $(N, Tw\_i\_1)$ and $(N, Tw\_i\_2)$ corresponding to two plaintext blocks included in the plaintext chunk $MC[i]$, and an encryption function $F\_K(*, *)$, the two-round Feistel encryption means 613 may find an i-th encrypted text chunk $CC[i]=(C[i\_1], C[i\_2])$ as:

$$C[i\_1]=F\_K((N,Tw\_i\_1),M[i\_1]) \text{xor } M[i\_2],$$

$$C[i\_2]=F\_K((N,Tw\_i\_2),C[i\_1]) \text{xor } M[i\_1].$$

The tag calculation means 614 (the tag calculation means 104, for example) calculates a plaintext checksum, and applies an encryption function assigned with an auxiliary variable to the resultant checksum thereby to generate an authentication tag.

The tag calculation means 614 calculates a plaintext checksum by use of a plaintext block $M[i\_2]$ included in each plaintext chunk, and assuming the resultant checksum SUM, the auxiliary variable $(N, Tw\_T\_1)$ given to the encryption function used for generating an authentication tag, and the encryption function $F\_K(*, *)$, may find an authentication tag T as $T=F\_K((N, Tw\_T\_1), \text{SUM})$.

As illustrated in FIG. 18(b), the authenticated encryption means 60 may include a decode means 62 (the decode means 20, for example), and the decode means 62 may have an encrypted text input means 621, a decode auxiliary variable generation means 622, a two-round Feistel decode means 623, a decode examination tag calculation means 624, and a determination means 625.

The encrypted text input means 621 (the input means 201, for example) inputs an encrypted text to be decoded, an initial vector, and an authentication tag.

The decode auxiliary variable generation means 622 (the auxiliary variable generation means 202, for example) generates the same auxiliary variable as in the encryption, which is to be given to each of the encryption functions, based on the initial vector and a size of the input encrypted text.

The two-round Feistel decode means 623 (the two-round Feistel decode means 203, for example) applies the two-round Feistel structure to each encrypted text chunk when dividing an encrypted text into chunks per two blocks, thereby generating decoded plaintext chunks corresponding to the encrypted text chunks.

Assuming an initial vector N, a chunk index i, an i-th encrypted text chunk $CC[i]=(C[i\_1], C[i\_2])$, a pair of auxiliary variables $(N, Tw\_i\_1)$ and $(N, Tw\_i\_2)$ corresponding to two encrypted text blocks included in the encrypted text chunk $CC[i]$, and an encryption function $F\_K(*, *)$, the two-round Feistel decode means 623 may find an i-th decoded plaintext chunk $MC'[i]=(M'[i\_1], M'[i\_2])$ as:

$$M'[i\_1]=F\_K((N,Tw\_i\_2),C[i\_1]) \text{xor } C[i\_2],$$

$$M'[i\_2]=F\_K((N,Tw\_i\_1),M'[i\_1]) \text{xor } C[i\_1].$$

The decode examination tag calculation means 624 (the decode examination tag calculation means 204, for example) calculates a decoded plaintext checksum, and applies the encryption function assigned with an auxiliary variable to the resultant checksum, thereby generating a decode examination authentication tag.

The decode examination tag calculation means 624 calculates a decoded plaintext checksum by use of each decoded plaintext block $M'[i\_2]$ included in each decoded plaintext chunk, and assuming the resultant checksum SUM', the auxiliary variable $(N, Tw\_T\_1)$ given to the encryption function used for generating a decode examination authentication tag, and the encryption function $F\_K(*, *)$, may find a decode examination authentication tag T' as $T'=F\_K((N, Tw\_T\_1), \text{SUM}')$.

The determination means 625 (the determination means 205, for example) determines whether the decode has succeeded or failed based on the decode examination authentication tag generated by the decode examination tag calculation means 624 and the input authentication tag.

The present invention has been described above with reference to the exemplary embodiments and the examples, but the present invention is not limited to the above exemplary embodiments. The structure and details of the present invention may be variously changed within the scope of the present invention understandable by those skilled in the art.

Some or all of the above exemplary embodiments may be described as in the following notes, but are not limited thereto.

(Note 1) An encryption device including an encryption means for applying a two-round Feistel structure using an encryption function assigned with an auxiliary variable for a round function per two blocks to an input plaintext thereby to generate an encrypted text.

(Note 2) The encryption device according to note 1, wherein the encryption means includes a plaintext input means for inputting a plaintext to be encrypted and an initial vector, an auxiliary variable generation means for generating an auxiliary variable given to each of the encryption functions based on the initial vector and a size of the input plaintext, a two-round Feistel encryption means for applying a two-round Feistel structure to each plaintext chunk when dividing the plaintext into chunks per two blocks thereby to generate encrypted text chunks corresponding to the plaintext chunks, and a tag calculation means for calculating a checksum of the plaintext, and applying an encryption function assigned with an auxiliary variable to the resultant checksum thereby to generate an authentication tag, the two-round Feistel encryption means finds an i-th encrypted text chunk CC[i]=(C[i_1], C[i_2]), assuming an initial vector N, a chunk index i, an i-th plaintext chunk MC[i]=(M[i_1], M[i_2]), a pair of auxiliary variables (N, Tw_i_1) and (N, Tw_i_2) corresponding to two plaintext blocks included in the plaintext chunk MC[i], and an encryption function F_K(*, *), as:

$$C[i\_1]=F\_K((N,Tw\_i\_1),M[i\_1]) \text{xor } M[i\_2],$$

C[i_2]=F_K((N, Tw_i_2), C[i_1]) xor M[i_1], and the tag calculation means calculates a checksum of a plaintext by use of a plaintext block M[i_2] included in each plaintext chunk, and assuming the resultant checksum SUM, an auxiliary variable (N, Tw_T_1) given to an encryption function used for generating an authentication tag, and an encryption function F_K(*, *), finds an authentication tag T as:

$$T=F\_K((N,Tw\_T\_1),\text{SUM}).$$

(Note 3) The encryption device according to note 2, wherein when an input plaintext is divided into even blocks and a size of the last block is less than a predetermined block size, the auxiliary variable generation means generates a second auxiliary variable for authentication tag as an auxiliary variable given to an encryption function used for generating an authentication tag, the encryption means includes:

a second two-round Feistel encryption means for applying a predetermined two-round Feistel structure to the last plaintext chunk including the last plaintext block thereby to generate the last encrypted text chunk including the last encrypted text block; and a second tag calculation means for calculating a checksum of a plaintext by use of the input plaintext and output from the second two-round Feistel encryption means, and applying an encryption function assigned with an auxiliary variable to the resultant checksum thereby to generate an authentication tag, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], an encryption function F_K(*, *), a size s of the last plaintext block, a block size n, a padding processing pad_n( ) from s size to n size, and a cutting processing cut_s( ) from n size to s size, the second two-round Feistel encryption means finds the last encrypted text chunk CC[m]=(C[m_1], C[m_2]) including the last encrypted text block C[m_2] with s size as:

$$C[m\_2]=\text{cut}\_s(Z) \text{xor } M[m\_2],$$

$$C[m\_1]=F\_K((N,Tw\_m\_2),\text{pad}\_n(C[m\_2])) \text{xor } M[m\_1]$$

where Z=F_K((N, Tw_m_1), M[m_1]), and a second tag calculation means calculates a checksum of a plaintext by use of a plaintext block M[i_2] included in each plaintext chunk except the last plaintext chunk, the Z, and C_n[m_2] obtained by padding the C[m_2] to n size, and finds an authentication tag T as:

T=F_K((N, Tw_T_2), SUM) assuming the resultant checksum SUM, the second auxiliary variable (N, Tw_T_2) for authentication tag, and an encryption function F_K(*, *).

(Note 4) The encryption device according to note 2 or note 3, wherein the auxiliary variable generation means generates a third auxiliary variable for authentication tag as an auxiliary variable given to an encryption function used for generating an authentication tag when an input plaintext is divided into odd blocks and a size of the last block is the same as a predetermined block size, and generates a fourth auxiliary variable for authentication tag as an auxiliary variable given to an encryption function used for generating an authentication tag when an input plaintext is divided into odd blocks and a size of the last block is less than a predetermined block size, the encryption means includes an one-round Feistel encryption means for applying a predetermined one-round Feistel structure to the last plaintext chunk including the last plaintext block thereby to generate the last encrypted text chunk including the last encrypted text block, and a third tag calculation means for calculating a checksum of a plaintext by use of the input plaintext and output from the one-round Feistel encryption means, and applying an encryption function assigned with an auxiliary variable to the resultant checksum thereby to generate an authentication tag, the one-round Feistel encryption means finds the last encrypted text chunk CC[m]=(C[m_1]) including the last encrypted text block C[m_1] with s size, assuming an index m of the last plaintext chunk, the last plaintext block M[m_1], the last plaintext chunk MC[m]=(M[m_1]), an auxiliary variable (N, Tw_m_1) corresponding to the last plaintext block, an encryption function F_K(*, *), a size s of the last plaintext block, a block size n, and a cutting processing cut_s( ) from n size to s size, as:

$$C[m\_1]=\text{cut}\_s(F\_K((N,Tw\_m\_1),0^{\wedge}n)) \text{xor } M[m\_1]$$

where if s=n, cut_s( ) may be omitted, and the third tag calculation means finds a checksum of a plaintext at s=n by use of a plaintext block M[i_2] included in each plaintext chunk except the last plaintext chunk, and the C[m_1], finds an authentication tag T as:

T=F_K((N, Tw_T_3), SUM) assuming the resultant checksum SUM, the third auxiliary variable (N, Tw_T_3) for authentication tag, and an encryption function F_K(*, *), calculates a checksum of a plaintext at s<n by use of a plaintext block M[i_2] included in each plaintext chunk except the last plaintext chunk, and C_n[m_1] obtained by padding the C[m_1] to n size, and finds an authentication tag T as:

T=F_K((N, Tw_T_4), SUM) assuming the resultant checksum SUM, the fourth auxiliary variable (N, Tw_T_4) for authentication tag, and an encryption function F_K(*, *).

(Note 5) The encryption device according to any one of note 1 to note 4, wherein an encryption function is Tweakable block encryption with two input variables including an auxiliary variable called Tweak.

(Note 6) The encryption device according to any one of note 1 to note 4, wherein an encryption function is a keyed hash function with coupled input of a first variable and a second variable.

(Note 7) A decode device includes: a decode means for applying a two-round Feistel structure using an encryption function assigned with an auxiliary variable for a round function per two blocks to an input encrypted text thereby to generate a decoded plaintext.

(Note 8) The decode device according to note 7, wherein the decode means includes an encrypted text input means for inputting an encrypted text to be decoded, an initial vector, and an authentication tag, a decode auxiliary variable generation means for generating the same auxiliary variable as in encryption, which is given to each of the encryption functions, based on the initial vector and a size of the input encrypted text, a two-round Feistel decode means for applying a two-round Feistel structure to each encrypted text chunk when dividing the encrypted text into chunks per two blocks thereby to generate decoded plaintext chunks corresponding to the encrypted text chunks, a decode examination tag calculation means for calculating a checksum of the decoded plaintext, and applying an encryption function assigned with an auxiliary variable to the resultant checksum thereby to generate a decode examination authentication tag, and a determination means for determining whether the decode has succeeded or failed based on the decode examination authentication tag generated by the decode examination tag calculation means and the input authentication tag, the two-round Feistel decode means finds an i-th decoded plaintext chunk MC'[i]=(M'[i_1], M'[i_2]), assuming an initial vector N, a chunk index i, an i-th encrypted text chunk CC[i]=(C[i_1], C[i_2]), a pair of auxiliary variables (N, Tw_i_1) and (N, Tw_i_2) corresponding to two encrypted text blocks included in the encrypted text chunk CC[i], and an encryption function F_K(*, *), as:

$$M'[i\_1]=F\_K((N,Tw\_i\_2),C[i\_1])\text{xor } C[i\_2],$$

M'[i_2]=F_K((N, Tw_i_1), M'[i_1]) xor C[i_1], and the decode examination tag calculation means calculates a checksum of a decoded plaintext by use of each decoded plaintext block M'[i_2] included in each decoded plaintext chunk, and finds a decode examination authentication tag T' as:

T'=F_K((N, Tw_T_1), SUM') assuming the resultant checksum SUM', an auxiliary variable (N, Tw_T_1) given to an encryption function used for generating a decode examination authentication tag, and an encryption function F_K(*, *).

(Note 9) The decode device according to note 8, wherein when an input encrypted text is divided into even blocks and a size of the last block is less than a predetermined block size, the decode auxiliary variable generation means generates the same second auxiliary variable for authentication tag as in encryption as an auxiliary variable given to an encryption function used for generating a decode examination authentication tag, the decode means includes:

a second two-round Feistel decode means for applying a predetermined two-round Feistel structure to the last encrypted text chunk including the last encrypted text block thereby to generate the last decoded plaintext chunk including a decoded plaintext block of the last encrypted block; and a second decode examination tag calculation means for calculating a checksum of a decoded plaintext by use of output from the two-round Feistel decode means, output from the second two-round Feistel decode means, and the last encrypted text block, and applying an encryption function assigned with an auxiliary variable to the resultant checksum thereby to generate a decode examination authentication tag, assuming an index m of the last encrypted text chunk, the last encrypted text block C[m_2], the last encrypted text chunk CC[m]=(C[m_1], C[m_2]), a pair of auxiliary variables (N, Tw_m_1) and (N, Tw_m_2) corresponding to two encrypted text blocks included in the last encrypted text chunk CC[m], an encryption function F_K(*, *), a size s of the last encrypted text block, a block size n, a padding processing pad_n( ) from s size to n size, and a cutting processing cut_s( ) from n size to s size, the second two-round Feistel decode means finds the last decoded plaintext chunk MC'[m]=(M'[m_1], M'[m_2]) including the last decoded plaintext block M'[m_2] with s size as:

$$M'[m\_1]=F\_K((N,Tw\_m\_2),\text{pad}\_n(C[m\_2]))\text{xor } C[m\_1],$$

$$M'[m\_2]=\text{cut}\_s(Z')\text{xor } C[m\_2],$$

where Z'=F_K((N, Tw_m_1), M'[m_1]), and the second decode examination tag calculation means calculates a checksum of a decoded plaintext by use of a decoded plaintext block M[i_2] included in each decoded plaintext chunk except the last decoded plaintext chunk, the Z', and M_n'[m_2] obtained by padding the M'[m_2] to n size, and finds a decode examination authentication tag T' as:

T'=F_K((N, Tw_T_2), SUM') assuming the resultant checksum SUM', the second auxiliary variable (N, Tw_T_2) for authentication tag, and an encryption function F_K(*, *).

(Note 10) The decode device according to note 8 or note 9, wherein the auxiliary variable generation means generates the same third auxiliary variable for authentication tag as in encryption as an auxiliary variable given to an encryption function used for generating a decode examination authentication tag when an input encrypted text is divided into odd blocks and a size of the last block is the same as a predetermined block size, and generates the same fourth auxiliary variable for authentication tag as in encryption as an auxiliary variable given to an encryption function used for generating an authentication tag when an input encrypted text is divided into odd blocks and a size of the last block is less than a predetermined block size, the decode means includes a one-round Feistel decode means for applying a predetermined one-round Feistel structure to the last encrypted text chunk including the last encrypted text block thereby to generate the last plaintext chunk including the last decoded plaintext block, and a third decode examination tag calculation means for calculating a checksum of a decoded plaintext by use of output from the two-round Feistel decode means and output from the one-round Feistel decode means, and applying an encryption function assigned with an auxiliary variable to the resultant checksum thereby to generate a decode examination authentication tag, the one-round Feistel decode means finds the last decoded plaintext chunk MC'[m]=(M'[m_1]) including the last decoded plaintext block M'[m_1] with s size, assuming an index m of the last encrypted text chunk, the last encrypted text block C[m_1], the last encrypted text chunk CC[m]=(C[m_1]), an auxiliary variable (N, Tw_m_1) corresponding to the last encrypted text block, an encryption function F_K(*, *), a size s of the last encrypted text block, a block size n, and a cutting processing cut_s( ) from n size to s size, as:

$$M'[m\_1]=\text{cut}\_s(F\_K((N,Tw\_m\_1),0\hat{\ }n))\text{xor}[m\_1]$$

where if s=n, cut_s( ) may be omitted, and the third decode examination tag calculation means calculates a checksum of a decoded plaintext at s=n by use of a plaintext block M'[i_2] included in each decoded plaintext chunk except the last decoded plaintext chunk, and the M'[m_1], finds a decode examination authentication tag T' as:

T'=F_K((N, Tw_T_3), SUM') assuming the resultant checksum SUM', the third auxiliary variable (N, Tw_T_3) for authentication tag, and an encryption function F_K(*, *), calculates a checksum of a decoded plaintext at s<n by use of a plaintext block M'[i_2] included in each decoded plaintext chunk except the last decoded plaintext chunk, and M_n'[m_1] obtained by padding the M'[m_1] to n size, and finds a decode examination authentication tag T' as:

$$T'=F\_K((N, Tw\_T\_4), SUM')$$

assuming the resultant checksum SUM', the fourth auxiliary variable (N, Tw_T_4) for authentication tag, and an encryption function F_K(*, *).

(Note 11) The decode device according to any one of note 7 to note 10, wherein an encryption function is Tweakable block encryption with two input variables including an auxiliary variable called Tweak.

(Note 12) The decode device according to any one of note 7 to note 10, wherein an encryption function is a keyed hash function with coupled input of a first variable and a second variable.

(Note 13) An authenticated encryption method, wherein in a two-round Feistel encryption processing of inputting a plaintext to be encrypted and an initial vector, generating an auxiliary variable given to each of the encryption functions based on the initial vector and a size of the input plaintext, and applying a two-round Feistel structure to each plaintext chunk when dividing the plaintext into chunks per two blocks thereby to generate encrypted text chunks corresponding to the plaintext chunks, an information processing apparatus finds an i-th encrypted text chunk CC[i]=(C[i_1], C[i_2]), assuming an initial vector N, a chunk index i, an i-th plaintext chunk MC[i]=(M[i_1], M[i_2]), a pair of auxiliary variables (N, Tw_i_1) and (N, Tw_i_2) corresponding to two plaintext blocks included in the plaintext chunk MC[i], and an encryption function F_K(*, *), as:

$$C[i\_1]=F\_K((N,Tw\_i\_1),M[i\_1]) \text{ xor } M[i\_2],$$

C[i_2]=F_K((N, Tw_i_2), C[i_1]) xor M[i_1], calculates a checksum of a plaintext by use of a plaintext block M[i_2] included in each plaintext chunk, and assuming the resultant checksum SUM, an auxiliary variable (N, Tw_T_1) given to an encryption function used for generating an authentication tag, and an encryption function F_K(*, *), finds an authentication tag T as:

$$T=F\_K((N,Tw\_T\_1),SUM).$$

(Note 14) The authenticated encryption method according to note 13, wherein in a second two-round Feistel encryption processing of generating a second auxiliary variable for authentication tag as an auxiliary variable given to an encryption function used for generating an authentication tag when an input plaintext is divided into even blocks and a size of the last block is less than a predetermined block size, applying a predetermined two-round Feistel structure to the last plaintext chunk including the last plaintext block thereby to generate the last encrypted text chunk including the last encrypted text block, an information processing apparatus finds the last encrypted text chunk CC[m]=(C [m_1], C[m_2]) including the last encrypted text block C[m_2] with s size, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], an encryption function F_K(*, *), a size s of the last plaintext block, a block size n, a padding processing pad_n( ) from s size to n size, and a cutting processing cut_s( ) from n size to s size, as:

$$C[m\_2]=\text{cut}\_s(Z) \text{ xor } M[m\_2],$$

$$C[m\_1]=F\_K((N,Tw\_m\_2),\text{pad}\_n(C[m\_2])) \text{ xor } M[m\_1]$$

where Z=F_K((N, Tw_m_1), M[m_1]), calculates a checksum of a plaintext by use of a plaintext block M[i_2] included in each plaintext chunk except the last plaintext chunk, the Z, and C_n[m_2] obtained by padding the C[m_2] to n size, and finds an authentication tag T as:

$$T=F\_K((N, Tw\_T\_2), SUM)$$

assuming the resultant checksum SUM, the second auxiliary variable (N, Tw_T_2) for authentication tag, and an encryption function F_K(*, *).

(Note 15) The authenticated encryption method according to note 13 or note 14, wherein in an one-round Feistel encryption processing of generating a third auxiliary variable for authentication tag as an auxiliary variable given to an encryption function used for generating an authentication tag when an input plaintext is divided into odd blocks and a size of the last block is the same as a predetermined block size, generating a fourth auxiliary variable for authentication tag as an auxiliary variable given to an encryption function used for generating an authentication tag when an input plaintext is divided into odd blocks and a size of the last block is less than a predetermined block size, and applying a predetermined one-round Feistel structure to the last plaintext chunk including the last plaintext block thereby to generate the last encrypted text chunk including the last encrypted text block, the method includes the steps of, assuming an index m of the last plaintext chunk, the last plaintext block M[m_1], the last plaintext chunk MC[m]= (M[m_1]), an auxiliary variable (N, Tw_m_1) corresponding to the last plaintext block, an encryption function F_K(*, *), a size s of the last plaintext block, a block size n, and a cutting processing cut_s( ) from n size to s size, finding the last encrypted text chunk CC[m]=(C[m_1]) including the last encrypted text block C[m_1] with s size as:

$$C[m\_1]=\text{cut}\_s(F\_K((N,Tw\_m\_1),0^\wedge n)) \text{ xor } M[m\_1]$$

where if s=n, cut_s( ) may be omitted, calculating a checksum of a plaintext at s=n by use of a plaintext block M[i_2] included in each plaintext chunk except the last plaintext chunk, and the C[m_1], finding an authentication tag T as:

$$T=F\_K((N, Tw\_T\_3), SUM)$$

assuming the resultant checksum SUM, the third auxiliary variable (N, Tw_T_3) for authentication tag, and an encryption function F_K(*, *), calculating a checksum of a plaintext at s<n by use of a plaintext block M[i_2] included in each plaintext chunk except the last plaintext chunk, and C_n[m_1] obtained by padding the C[m_1] to n size, and finding an authentication tag T as:

$$T=F\_K((N, Tw\_T\_4), SUM)$$

assuming the resultant checksum SUM, the fourth auxiliary variable (N, Tw_T_4) for authentication tag, and an encryption function F_K(*, *).

(Note 16) An authenticated encryption method, wherein in a two-round Feistel decode processing of inputting an encrypted text to be decoded, an initial vector, and an authentication tag, generating the same auxiliary variable as in encryption, which is given to each of the encryption functions, based on the initial vector and a size of the input encrypted text, and applying a two-round Feistel structure to each encrypted text chunk when dividing the encrypted text into chunks per two blocks thereby to generate decoded plaintext chunks corresponding to the encrypted text chunks, an information processing apparatus finds an i-th decoded plaintext chunk MC'[i]=(M'[i_1], M'[i_2]), assuming an initial vector N, a chunk index i, an i-th encrypted text chunk CC[i]=(C[i_1], C[i_2]), a pair of auxiliary variables (N, Tw_i_1) and (N, Tw_i_2) corresponding to two encrypted text blocks included in the encrypted text chunk CC[i], and an encryption function F_K(*, *), as:

$$M'[i\_1]=F\_K((N,Tw\_i\_2),C[i\_1]) \text{ xor } C[i\_2],$$

M'[i_2]=F_K((N, Tw_i_1), M'[i_1]) xor C[i_1], calculates a checksum of a decoded plaintext by use of each decoded plaintext block M'[i_2] included in each decoded plaintext chunk, and finds a decode examination authentication tag T' as:

T'=F_K((N, Tw_T_1), SUM') assuming the resultant checksum SUM', an auxiliary variable (N, Tw_T_1) given to an encryption function used for generating a decode examination authentication tag, and an encryption function F_K(*, *).

(Note 17) The authenticated encryption method according to note 16, wherein in a second two-round Feistel decode processing of generating the same second auxiliary variable for authentication tag as in encryption as an auxiliary variable given to an encryption function used for generating a decode examination authentication tag when an input encrypted text is divided into even blocks and a size of the last block is less than a predetermined block size, and applying a predetermined two-round Feistel structure to the last encrypted text chunk including the last encrypted text block thereby to generate the last decoded plaintext chunk including a decoded plaintext block of the last encrypted block, the method includes the steps of, assuming an index m of the last encrypted text chunk, the last encrypted text block C[m_2], the last encrypted text chunk CC[m]=(C[m_1], C[m_2]), a pair of auxiliary variables (N, Tw_m_1) and (N, Tw_m_2) corresponding to two encrypted text blocks included in the last encrypted text chunk CC[m], an encryption function F_K(*, *), a size s of the last encrypted text block, a block size n, a padding processing pad_n( ) from s size to n size, and a cutting processing cut_s( ) from n size to s size, finding the last decoded plaintext chunk MC'[m]=(M'[m_1], M'[m_2]) including the last decoded plaintext block M'[m_2] with s size as:

$$M'[m\_1]=F\_K((N,Tw\_m\_2),pad\_n(C[m\_2]))\text{xor } C[m\_1],$$

$$M'[m\_2]=\text{cut}\_s(Z')\text{xor } C[m\_2],$$

where Z'=F_K((N, Tw_m_1), M'[m_1]), calculating a checksum of a decoded plaintext by use of a decoded plaintext block M[i_2] included in each decoded plaintext chunk except the last decoded plaintext chunk, the Z', and M_n'[m_2] obtained by padding the M'[m_2] to n size, and finding a decode examination authentication tag T' as:

T'=F_K((N, Tw_T_2), SUM') assuming the resultant checksum SUM', the second auxiliary variable (N, Tw_T_2) for authentication tag, and an encryption function F_K(*, *).

(Note 18) The authenticated encryption method according to note 16 or note 17, wherein in an one-round Feistel decode processing of generating the same third auxiliary variable for authentication tag as in encryption as an auxiliary variable given to an encryption function used for generating a decode examination authentication tag when an input encrypted text is divided into odd blocks and a size of the last block is the same as a predetermined block size, generating the same fourth auxiliary variable for authentication tag as in encryption as an auxiliary variable given to an encryption function used for generating an authentication tag when an input encrypted text is divided into odd blocks and a size of the last block is less than a predetermined block size, and applying a predetermined one-round Feistel structure to the last encrypted text chunk including the last encrypted text block thereby to generate the last plaintext chunk including the last decoded plaintext block, the method includes the steps of, assuming an index m of the last encrypted text chunk, the last encrypted text block C[m_1], the last encrypted text chunk CC[m]=(C[m_1]), an auxiliary variable (N, Tw_m 1) corresponding to the last encrypted text block, an encryption function F_K(*, *), a size s of the last encrypted text block, a block size n, and a cutting processing cut_s( ) from n size to s size, finding the last decoded plaintext chunk MC'[m]=(M'[m_1]) including the last decoded plaintext block M'[m_1] with s size as:

$$M'[m\_1]=\text{cut}\_s(F\_K((N,Tw\_m\_1),0^\wedge n))\text{xor}[m\_1]$$

where if s=n, cut_s( ) may be omitted, calculating a checksum of a decoded plaintext at s=n by use of a plaintext block M'[i_2] included in each decoded plaintext chunk except the last decoded plaintext chunk, and the M'[m_1], findings a decode examination authentication tag T' as:

T'=F_K((N, Tw_T_3), SUM') assuming the resultant checksum SUM', the third auxiliary variable (N, Tw_T_3) for authentication tag, and an encryption function F_K(*, *), calculating a checksum of a decoded plaintext at s<n by use of a plaintext block M'[i_2] included in each decoded plaintext chunk except the last decoded plaintext chunk, and M_n'[m_1] obtained by padding the M'[m_1] to n size, and finding a decode examination authentication tag T' as:

T'=F_K((N, Tw_T_4), SUM') assuming the resultant checksum SUM', the fourth auxiliary variable (N, Tw_T_4) for authentication tag, and an encryption function F_K(*, *).

(Note 19) The authenticated encryption method according to any one of note 13 to note 18, wherein an encryption function is Tweakable block encryption with two input variables including an auxiliary variable called Tweak.

(Note 20) The authenticated encryption method according to any one of note 13 to note 18, wherein an encryption function is a keyed hash function with coupled input of a first variable and a second variable.

(Note 21) A program for authenticated encryption for causing a computer to perform a plaintext input processing of inputting a plaintext to be encrypted and an initial vector, an auxiliary variable generation processing of generating an auxiliary variable given to each of the encryption functions based on the initial vector and a size of the input plaintext, a two-round Feistel encryption processing of applying a two-round Feistel structure to each plaintext chunk when dividing the plaintext into chunks per two blocks thereby to generate encrypted text chunks corresponding to the plaintext chunks, a tag calculation processing of calculating a checksum of the plaintext, and applying an encryption function assigned with an auxiliary variable to the resultant checksum thereby to generate an authentication tag, a two-round Feistel encryption processing of, assuming an initial vector N, a chunk index i, an i-th plaintext chunk MC[i]=(M[i_1], M[i_2]), a pair of auxiliary variables (N, Tw_i_1) and (N, Tw_i_2) corresponding to two plaintext blocks included in the plaintext chunk MC[i], and an encryption function F_K(*, *), finding an i-th encrypted text chunk CC[i]=(C[i_1], C[i_2]) as:

$$C[i\_1]=F\_K((N,Tw\_i\_1),M[i\_1])\text{xor } M[i\_2],$$

C[i_2]=F_K((N, Tw_i_2), C[i_1]) xor M[i_1], and a tag calculation processing of calculating a checksum of a plaintext by use of a plaintext block M[i_2] included in each plaintext chunk, and assuming the resultant checksum SUM, an auxiliary variable (N, Tw_T_1) given to an encryption function used for generating an authentication tag, and an encryption function F_K(*, *), finding an authentication tag T as:

$$T=F\_K((N,Tw\_T\_1),\text{SUM}).$$

(Note 22) The program for authenticated encryption according to note 21, the program for causing a computer to perform an auxiliary variable generation processing of generating a second auxiliary variable for authentication tag as an auxiliary variable given to an encryption function used for generating an authentication tag when an input plaintext is divided into even blocks and a size of the last block is less than a predetermined block size, a two-round Feistel encryption processing of, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], an encryption function F_K(*, *), a size s of the last plaintext block, a block size n, a padding processing pad_n( ) from s size to n size, and a cutting processing cut from n size to s size, finding the last encrypted text chunk CC[m]=(C[m_1], C[m_2]) including the last encrypted text block C[m_2] with s size as:

$C[m\_2]=cut\_s(Z)$ xor $M[m\_2]$, $C[m\_1]=F\_K((N,Tw\_m\_2),pad\_n(C[m\_2]))$ xor $M[m\_1]$ where $Z=F\_K((N, Tw\_m\_1), M[m\_1])$, and a second tag calculation processing of calculating a checksum of a plaintext by use of a plaintext block M[i_2] included in each plaintext chunk except the last plaintext chunk, the Z, and C_n[m_2] obtained by padding the C[m_2] to n size, and finding an authentication tag T as:

T=F_K((N, Tw_T_2), SUM) assuming the resultant checksum SUM, the second auxiliary variable (N, Tw_T_2) for authentication tag, and an encryption function F_K(*, *).

(Note 23) The program for authenticated encryption according to note 21 or note 22, the program for causing a computer to perform an auxiliary variable generation processing of generating a third auxiliary variable for authentication tag as an auxiliary variable given to an encryption function used for generating an authentication tag when an input plaintext is divided into odd blocks and a size of the last block is the same as a predetermined block size, and generating a fourth auxiliary variable for authentication tag as an auxiliary variable given to an encryption function used for generating an authentication tag when an input plaintext is divided into odd blocks and a size of the last block is less than a predetermined block size, a two-round Feistel encryption processing of, assuming an index m of the last plaintext chunk, the last plaintext block M[m_1], the last plaintext chunk MC[m]=(M[m_1]), an auxiliary variable (N, Tw_m_1) corresponding to the last plaintext block, an encryption function F_K(*, *), a size s of the last plaintext block, a block size n, and a cutting processing cut_s( ) from n size to s size, finding the last encrypted text chunk CC[m]=(C[m_1]) including the last encrypted text block C[m_1] with s size as:

$C[m\_1]=cut\_s(F\_K((N,Tw\_m\_1),0^\wedge n))$ xor $M[m\_1]$ where if s=n, cut_s( ) may be omitted, and a tag calculation processing of calculating a checksum of a plaintext at s=n by use of a plaintext block M[i_2] included in each plaintext chunk except the last plaintext chunk, and the C[m_1], finding an authentication tag T as:

T=F_K((N, Tw_T_3), SUM) assuming the resultant checksum SUM, the third auxiliary variable (N, Tw_T_3) for authentication tag, and an encryption function F_K(*, *), calculating a checksum of a plaintext at s<n by use of a plaintext block M[i_2] included in each plaintext chunk except the last plaintext chunk, and C_n[m_1] obtained by padding the C[m_1] to n size, and finding an authentication tag T as:

T=F_K((N, Tw_T_4), SUM) assuming the resultant checksum SUM, the fourth auxiliary variable (N, Tw_T_4) for authentication tag, and an encryption function F_K(*, *).

(Note 24) A program for authenticated encryption causing a computer to perform an encrypted text input processing of inputting an encrypted text to be decoded, an initial vector, and an authentication tag, a decode auxiliary variable generation processing of generating the same auxiliary variable as in encryption, which is given to each of the encryption functions, based on the initial vector and a size of the input encrypted text, a two-round Feistel decode processing of applying a two-round Feistel structure to each encrypted text chunk when dividing the encrypted text into chunks per two blocks thereby to generate decoded plaintext chunks corresponding to the encrypted text chunks, a decode examination tag calculation processing of calculating a checksum of the decoded plaintext, and applying an encryption function assigned with an auxiliary variable to the resultant checksum thereby to generate a decode examination authentication tag, a determination processing of determining whether the decode has succeeded or failed based on the decode examination authentication tag generated by the decode examination tag calculation means and the input authentication tag, a two-round Feistel decode processing of, assuming an initial vector N, a chunk index i, an i-th encrypted text chunk CC[i]=(C[i_1], C[i_2]), a pair of auxiliary variables (N, Tw_i_1) and (N, Tw_i_2) corresponding to two encrypted text blocks included in the encrypted text chunk CC[i], and an encryption function F_K(*, *), finding an i-th decoded plaintext chunk MC'[i]=(M'[i_1], M'[i_2]) as:

$M'[i\_1]=F\_K((N,Tw\_i\_2),C[i\_1])$ xor $C[i\_2]$, $M'[i\_2]=F\_K((N, Tw\_i\_1), M'[i\_1])$ xor $C[i\_1]$, and a decode examination tag calculation processing of calculating a checksum of a decoded plaintext by use of each decoded plaintext block M'[i_2] included in each decoded plaintext chunk, and finding a decode examination authentication tag T' as:

T'=F_K((N, Tw_T_1), SUM') assuming the resultant checksum SUM', an auxiliary variable (N, Tw_T_1) given to an encryption function used for generating a decode examination authentication tag, and an encryption function F_K(*, *).

(Note 25) The program for authenticated encryption according to note 24, the program for causing a computer to perform a decode auxiliary variable generation processing of generating the same second auxiliary variable for authentication tag as in encryption as an auxiliary variable given to an encryption function used for generating a decode examination authentication tag when an input encrypted text is divided into even blocks and a size of the last block is less than a predetermined block size, a two-round Feistel decode processing of, assuming an index m of the last encrypted text chunk, the last encrypted text block C[m_2], the last encrypted text chunk CC[m]=(C[m_1], C[m_2]), a pair of auxiliary variables (N, Tw_m_1) and (N, Tw_m_2) corresponding to two encrypted text blocks included in the last encrypted text chunk CC[m], an encryption function F_K(*, *), a size s of the last encrypted text block, a block size n, a padding processing pad_n( ) from s size to n size, and a cutting processing cut_s( ) from n size to s size, finding the last decoded plaintext chunk MC'[m]=(M'[m_1], M'[m_2]) including the last decoded plaintext block M'[m_2] with s size as:

$M'[m\_1]=F\_K((N,Tw\_m\_2),pad\_n(C[m\_2]))$ xor $C[m\_1]$, $M'[m\_2]=cut\_s(Z')$ xor $C[m\_2]$, where $Z'=F\_K((N, Tw\_m\_1), M'[m\_1])$, and a decode examination tag calculation processing of calculating a checksum of a decoded plaintext by use of a decoded plaintext block $M[i\_2]$ included in each decoded plaintext chunk except the last decoded plaintext chunk, the $Z'$, and $M\_n'[m\_2]$ obtained by padding the $M'[m\_2]$ to n size, and finding a decode examination authentication tag T' as:

$T'=F\_K((N, Tw\_T\_2), SUM')$ assuming the resultant checksum SUM', the second auxiliary variable $(N, Tw\_T\_2)$ for authentication tag, and an encryption function $F\_K(*, *)$.

(Note 26) The program for authenticated encryption according to note 24 or note 25, the program causing a computer to perform an auxiliary variable generation processing of generating the same third auxiliary variable for authentication tag as in encryption as an auxiliary variable given to an encryption function used for generating a decode examination authentication tag when an input encrypted text is divided into odd blocks and a size of the last block is the same as a predetermined block size, and generating the same fourth auxiliary variable for authentication tag as in encryption as an auxiliary variable given to an encryption function used for generating a decode examination authentication tag when an input encrypted text is divided into odd blocks and a size of the last block is less than a predetermined block size, a two-round Feistel decode processing of, assuming an index m of the last encrypted text chunk, the last encrypted text block $C[m\_1]$, the last encrypted text chunk $CC[m]=(C[m\_1])$, an auxiliary variable $(N, Tw\_m\_1)$ corresponding to the last encrypted text block, an encryption function $F\_K(*, *)$, a size s of the last encrypted text block, a block size n, and a cutting processing $cut\_s(\ )$ from n size to s size, finding the last decoded plaintext chunk $MC'[m]=(M'[m\_1])$ including the last decoded plaintext block $M'[m\_1]$ with s size as:

$$M'[m\_1]=cut\_s(F\_K((N,Tw\_m\_1),0\char`\^n))\text{xor}[m\_1]$$

where if s=n, $cut\_s(\ )$ may be omitted, and a decode examination tag calculation processing of calculating a checksum of a decoded plaintext at s=n by use of a plaintext block $M'[i\_2]$ included in each decoded plaintext chunk except the last decoded plaintext chunk, and the $M'[m\_1]$, finding a decode examination authentication tag T' as:

$T'=F\_K((N, Tw\_T\_3), SUM')$ assuming the resultant checksum SUM', the third auxiliary variable $(N, Tw\_T\_3)$ for authentication tag, and an encryption function $F\_K(*, *)$, calculating a checksum of a decoded plaintext at s<n by use of a plaintext block $M'[i\_2]$ included in each decoded plaintext chunk except the last decoded plaintext chunk, and $M\_n'[m\_1]$ obtained by padding the $M'[m\_1]$ to n size, and finding a decode examination authentication tag T' as:

$T'=F\_K((N, Tw\_T\_4), SUM')$ assuming the resultant checksum SUM', the fourth auxiliary variable $(N, Tw\_T\_4)$ for authentication tag, and an encryption function $F\_K(*, *)$.

(Note 27) The program for authenticated encryption according to any one of note 21 to note 26, wherein an encryption function is Tweakable block encryption with two input variables including an auxiliary variable called Tweak.

(Note 28) The program for authenticated encryption according to any one of note 21 to note 26, wherein an encryption function is a keyed hash function with coupled input of a first variable and a second variable.

The present application claims the priority based on Japanese Patent Application No. 2013-161446 filed on Aug. 2, 2013, the disclosure of which is all incorporated herein by reference.

INDUSTRIAL APPLICABILITY

The present invention is suitably applicable to applications such as encryption, message authentication, and protection of storage such as database in wireless or wired data communication.

REFERENCE SIGNS LIST 30, 60 Authenticated encryption means
10, 61 Encryption means
101 Input means
611 Plaintext input means
102, 612 Auxiliary variable generation means
103, 613 Two-round Feistel encryption means
104, 614 Tag calculation means
105 Output means
20, 62 Decode means
201 Input means
621 Encrypted text input means
202 Auxiliary variable generation means
622 Decode auxiliary variable generation means
203, 623 Two-round Feistel decode means
204, 624 Decode examination tag calculation means
205, 625 Determination means
206 Output means

The invention claimed is:

1. An authenticated encryption device for applying a two-round Feistel structure using an encryption function assigned with an auxiliary variable for a round function per two blocks to an input plaintext or encrypted text, generating an encrypted text or decoded plaintext, and applying the encryption function to a checksum calculated by use of some bits in the input plaintext or the decoded plaintext, and generating an authentication tag, the authenticated encryption device comprising:

a non-transitory memory storing instructions; and
a processor configured to execute the instructions to:
input a plaintext to be encrypted and an initial vector;
generate the auxiliary variable given to each of the encryption functions based on the initial vector and a size of the input plaintext;
apply the two-round Feistel structure to each plaintext chunk when dividing the plaintext into chunks per two blocks thereby to generate encrypted text chunks corresponding to the plaintext chunks;
calculate the checksum of the plaintext, and applying the encryption function assigned with the auxiliary variable to the resultant checksum thereby to generate the authentication tag,
assuming the initial vector N, a chunk index i, an i-th plaintext chunk $MC[i]=(M[i\_1], M[i\_2])$, a pair of auxiliary variables $(N, Tw\_i\_1)$ and $(N, Tw\_i\_2)$ corresponding to two plaintext blocks included in the plaintext chunk $MC[i]$, and the encryption function $F\_K(*, *)$, find an i-th encrypted text chunk $CC[i]=(C[i\_1], C[i\_2])$ as:

$C[i\_1]=F\_K((N,Tw\_i\_1),M[i\_1])\text{xor } M[i\_2],$ $C[i\_2]=F\_K((N,Tw\_i\_2),C[i\_1])\text{xor } M[i\_1],$ and calculate the checksum of the plaintext by use of a plaintext block $M[i\_2]$ included in each plaintext chunk, and assuming the resultant checksum SUM, an auxiliary variable $(N, Tw\_T\_1)$ given to the encryption function used for generating the authentication tag, and the encryption function $F\_K(*, *)$, find the authentication tag T as: $T=F\_K((N, Tw\_T\_1), SUM)$;

when the input plaintext is divided into even blocks and a size of the last block is less than a predetermined block size, apply a predetermined two-round Feistel structure to the last plaintext chunk including the last plaintext block thereby to generate the last encrypted text chunk including the last encrypted text block; and when the input plaintext is divided into even blocks and the size of the last block is less than the predetermined block size, calculate the checksum of the plaintext by use of the input plaintext and output from applying the predetermined two-round Feistel structure, and apply an encryption function assigned with an auxiliary variable to the resultant checksum thereby to generate the authentication tag, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], the encryption function $F\_K(*, *)$, a size s of the last plaintext block, a block size n, a padding processing pad_n( ) from s bits to n bits, and a cutting processing cut_s( ) from n bits to s bits, find the last encrypted text chunk CC[m]=(C[m_1], C[m_2]) including the last encrypted text block C[m_2] with s bits as:

$C[m\_2]=cut\_s(Z)$ xor $M[m\_2]$, $C[m\_1]=F\_K((N,Tw\_m\_2),pad\_n(C[m\_2]))$ xor $M[m\_1]$, where $Z=F\_K((N, Tw\_m\_1), M[m\_1])$, and calculate the checksum of the plaintext by use of the plaintext block M[i_2] included in each plaintext chunk except the last plaintext chunk, the Z, and C_n[m_2] obtained by padding the C[m_2] to n bits, and finds the authentication tag T as: $T=F\_K((N, Tw\_T\_2), SUM)$ assuming the resultant checksum SUM, an auxiliary variable (N, Tw_T_2) given to the encryption function used for generating the authentication tag, and the encryption function $F\_K(*, *)$.

2. The authenticated encryption device according to claim 1, wherein the processor is further configured to execute the instructions to:

when the input plaintext is divided into odd blocks, apply a predetermined one-round Feistel structure to the last plaintext chunk including the last plaintext block thereby to generate the last encrypted text chunk including the last encrypted text block; and when the input plaintext is divided into odd blocks, calculate the checksum of the plaintext by use of the input plaintext and output from applying the predetermined one-round Feistel structure to the last plaintext chunk, and apply the encryption function assigned with the auxiliary variable to the resultant checksum thereby to generate the authentication tag, assuming an index m of the last plaintext chunk, the last plaintext block M[m_1], the last plaintext chunk MC[m]=(M[m_1]), an auxiliary variable (N, Tw_m_1) corresponding to the last plaintext block, an encryption function $F\_K(*, *)$, a size s of the last plaintext block, a block size n, and a cutting processing cut_s( ) from n bits to s bits, find the last encrypted text chunk CC[m]=(C[m_1]) including the last encrypted text block C[m_1] with s bits as:

$C[m\_1]=cut\_s(F\_K((N,Tw\_m\_1),0\char`\^n))$ xor $M[m\_1]$ where if s=n, cut_s( ) may be omitted, and the third tag calculation unit calculate a checksum of a plaintext by use of a plaintext block M[i_2] included in each plaintext chunk except the last plaintext chunk, and M_n[m_1] (where, if s=n, the padding processing may be omitted) obtained by padding the M[m_1] to n bits, and find the authentication tag T as:

$T=F\_K((N, Tw\_T\_3), SUM)$ assuming the resultant checksum SUM, an auxiliary variable (N, Tw_T_3) given to the encryption function used for generating the authentication tag, and the encryption function $F\_K(*, *)$.

3. The authenticated encryption device according to claim 1, wherein the encryption function is Tweakable block encryption with two input variables including an auxiliary variable called Tweak.

4. The authenticated encryption device according to claim 1, wherein the encryption function is a keyed hash function with coupled input of a first variable and a second variable.

5. An authenticated encryption device for applying a two-round Feistel structure using an encryption function assigned with an auxiliary variable for a round function per two blocks to an input plaintext or encrypted text and generating an encrypted text or decoded plaintext, and applying the encryption function to a checksum calculated by use of some bits in the input plaintext or the decoded plaintext and generating an authentication tag, the authenticated encryption device comprising:

a non-transitory memory storing instructions; and
a processor configured to execute the instructions to:
input the encrypted text to be decoded, an initial vector, and the authentication tag;
generate the same auxiliary variable as in encryption, which is given to each of the encryption functions, based on the initial vector and a size of the input encrypted text;
apply the two-round Feistel structure to each encrypted text chunk when dividing the encrypted text into chunks per two blocks thereby to generate decoded plaintext chunks corresponding to the encrypted text chunks;
calculate the checksum of the decoded plaintext, and apply the encryption function assigned with the auxiliary variable to the resultant checksum thereby to generate a decode examination authentication tag;
determine whether the decode has succeeded or failed based on the decode examination authentication tag generated by the decode examination tag calculation unit and the input authentication tag,
assuming the initial vector N, a chunk index i, an i-th encrypted text chunk CC[i]=(C[i_1], C[i_2]), a pair of auxiliary variables (N, Tw_i_1) and (N, Tw_i_2) corresponding to two encrypted text blocks included in the encrypted text chunk CC[i], and the encryption function $F\_K(*, *)$, the two round Feistel decode unit find an i-th decoded plaintext chunk MC'[i]=(M'[i_1], M'[i_2]) as:

$M'[i\_1]=F\_K((N,Tw\_i\_2),C[i\_1])$ xor $C[i\_2]$, $M'[i\_2]=F\_K((N,Tw\_i\_1),M'[i\_1])$ xor $C[i\_1]$, and calculate the checksum of the decoded plaintext by use of each decoded plaintext block M'[i_2] included in each decoded plaintext chunk, and find the decode examination authentication tag T' as:

T'=F_K((N, Tw_T_1), SUM') assuming the resultant checksum SUM', an auxiliary variable (N, Tw_T_1) given to the encryption function used for generating the decode examination authentication tag, and the encryption function F_K(*, *), when the input encrypted text is divided into even blocks and a size of the last block is less than a predetermined block size, apply a predetermined two-round Feistel structure to the last encrypted text chunk including the last encrypted text block thereby to generate the last decoded plaintext chunk including a decoded plaintext block of the last encrypted block; and when the input encrypted text is divided into even blocks and the size of the last block is less than the predetermined block size, calculating the checksum of the decoded plaintext by use of output from applying the two-round Feistel structure to each encrypted text chunk, output from applying the predetermined two-round Feistel structure to the last encrypted text chunk, and the last encrypted text block, and apply the encryption function assigned with the auxiliary variable to the resultant checksum thereby to generate the decode examination authentication tag, assuming an index m of the last encrypted text chunk, the last encrypted text block C[m_2], the last encrypted text chunk CC[m]=(C[m_1], C[m_2]), a pair of auxiliary variables (N, Tw_m_1) and (N, Tw_m_2) corresponding to two encrypted text blocks included in the last encrypted text chunk CC[m], the encryption function F_K(*, *), a size s of the last encrypted text block, a block size n, a padding processing pad_n( ) from s bits to n bits, and a cutting processing cut_s( ) from n bits to s bits, find the last decoded plaintext chunk MC'[m]=(M'[m_1], M'[m_2]) including the last decoded plaintext block M'[m_2] with s bits as:

$M'[m\_1]=F\_K((N,Tw\_m\_2),pad\_n(C[m\_2]))\text{xor } C[m\_1]$, $M'[m\_2]=cut\_s(Z')\text{xor } C[m\_2]$, where $Z'=F\_K((N, Tw\_m\_1), M'[m\_1])$, and calculate the checksum of the decoded plaintext by use of a decoded plaintext block M'[i_2] included in each decoded plaintext chunk except the last decoded plaintext chunk, the Z', and C_n[m_2] obtained by padding the C[m_2] to n bits, and find the decode examination authentication tag T' as:

T'=F_K((N, Tw_T_2), SUM') assuming the resultant checksum SUM', an auxiliary variable (N, Tw_T_2) given to the encryption function used for generating the decode examination authentication tag, and the encryption function F_K(*, *).

6. The authenticated encryption device according to claim 5, wherein the processor is further configured to execute the instructions to:

when the input encrypted text is divided into odd blocks, apply a predetermined one-round Feistel structure to the last encrypted text chunk including the last encrypted text block thereby to generate the last plaintext chunk including the last decoded plaintext block; and when the input encrypted text is divided into odd blocks, calculate the checksum of the decoded plaintext by use of output from applying the two-round Feistel structure to each encrypted text chunk and output from applying the predetermined one-round Feistel structure to the last encrypted test chunk, and apply the encryption function assigned with the auxiliary variable to the resultant checksum thereby to generate the decode examination authentication tag, assuming an index m of the last encrypted text chunk, the last encrypted text block C[m_1], the last encrypted text chunk CC[m]=(C[m_1]), an auxiliary variable (N, Tw_m_1) corresponding to the last encrypted text block, an encryption function F_K(*, *), a size s of the last encrypted text block, a block size n, and a cutting processing cut_s( ) from n bits to s bits, find the last decoded plaintext chunk MC'[m]=(M'[m_1]) including the last decoded plaintext block M'[m_1] with s bits as:

$M'[m\_1]=cut\_s(F\_K((N,Tw\_m\_1),0\hat{\ }n))\text{xor}[m\_1]$ where if s=n, cut_s( ) may be omitted, and calculate the checksum of the decoded plaintext by use of the plaintext block M'[i_2] included in each decoded plaintext chunk except the last decoded plaintext chunk, and M_n'[m_1] (where if s=n, the padding processing may be omitted) obtained by padding the M'[m_1] to n bits, and find the decode examination authentication tag T' as:

T'=F_K((N, Tw_T_3), SUM') assuming the resultant checksum SUM', an auxiliary variable (N, Tw_T_3) given to the encryption function used for generating the decode examination authentication tag, and the encryption function F_K(*, *).

7. An authenticated encryption method wherein an information processing apparatus applies a two-round Feistel structure using an encryption function assigned with an auxiliary variable for a round function per two blocks to an input plaintext or encrypted text and generates an encrypted text or decoded plaintext, and applies the encryption function to a checksum calculated by use of some bits in the input plaintext or the decoded plaintext and generates an authentication tag, wherein the information processing apparatus performs an encryption processing, in the encryption processing, the information processing apparatus performs:

a plaintext input processing of inputting a plaintext to be encrypted and an initial vector;

an auxiliary variable generation processing of generating the auxiliary variable given to each of the encryption functions based on the initial vector and a size of the input plaintext;

a two-round Feistel encryption processing of applying the two-round Feistel structure to each plaintext chunk when dividing the plaintext into chunks per two blocks thereby to generate encrypted text chunks corresponding to the plaintext chunks; and a tag calculation processing of calculating the checksum of the plaintext, and applying the encryption function assigned with the auxiliary variable to the resultant checksum thereby to generate the authentication tag, assuming the initial vector N, a chunk index i, an i-th plaintext chunk MC[i]=(M[i_1], M[i_2]), a pair of auxiliary variables (N, Tw_i_1) and (N, Tw_i_2) corresponding to two plaintext blocks included in the plaintext chunk MC[i], and the encryption function F_K(*, *), in the two-round Feistel encryption processing, the information processing apparatus finds an i-th encrypted text chunk CC[i]=(C[i_1], C[i_2]) as:

$C[i\_1]=F\_K((N,Tw\_i\_1),M[i\_1])$ xor $M[i\_2]$, $C[i\_2]=F\_K((N,Tw\_i\_2),C[i\_1])$ xor $M[i\_1]$, and in the tag calculation processing, the information processing apparatus calculates the checksum of the plaintext by use of a plaintext block M[i_2] included in each plaintext chunk, and assuming the resultant checksum SUM, an auxiliary variable (N, Tw_T_1) given to the encryption function used for generating the authentication tag, and the encryption function F_K(*, *), finds the authentication tag T as:

$T=F\_K((N,Tw\_T\_1),SUM)$, wherein in the encryption processing, the information processing apparatus performs:

a second two-round Feistel encryption processing of, when the input plaintext is divided into even blocks and a size of the last block is less than a predetermined block size, applying a predetermined two-round Feistel structure to the last plaintext chunk including the last plaintext block thereby to generate the last encrypted text chunk including the last encrypted text block; and a second tag calculation processing of, when an input plaintext is divided into even blocks and the size of the last block is less than the predetermined block size, calculating the checksum of the plaintext by use of the input plaintext and output from the second two-round Feistel encryption processing, and applying the encryption function assigned with the auxiliary variable to the resultant checksum thereby to generate the authentication tag, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], the encryption function F_K(*, *), a size s of the last plaintext block, a block size n, a padding processing pad_n( ) from s bits to n bits, and a cutting processing cut_s( ) from n bits to s bits, in the second two-round Feistel encryption processing, the information processing apparatus finds the last encrypted text chunk CC[m]=(C[m_1], C[m_2]) including the last encrypted text block C[m_2] with s bits as:

$C[m\_2]=cut\_s(Z)$ xor $M[m\_2]$, $C[m\_1]=F\_K((N,Tw\_m\_2),pad\_n(C[m\_2]))$ xor $M[m\_1]$ where $Z=F\_K((N, Tw\_m\_1), M[m\_1])$, and in the second tag calculation processing, the information processing apparatus calculates the checksum of the plaintext by use of the plaintext block M[i_2] included in each plaintext chunk except the last plaintext chunk, the Z, and C_n[m_2] obtained by padding the C[m_2] to n bits, and finds an authentication tag T as:

T=F_K((N, Tw_T_2), SUM) assuming the resultant checksum SUM, an auxiliary variable (N, Tw_T_2) given to the encryption function used for generating the authentication tag, and the encryption function F_K(*, *).

8. A non-transitory computer-readable recording medium in which a program for authenticated encryption is recorded, the program causing a computer to perform:

a processing of applying a two-round Feistel structure using an encryption function assigned with an auxiliary variable for a round function per two blocks to an input plaintext or encrypted text, generating an encrypted text or decoded plaintext, and applying the encryption function to a checksum calculated by use of some bits in the input plaintext or the decoded plaintext, and generating an authentication tag, wherein the program causing the computer to perform an encryption processing, in the encryption processing, the program causing the computer to perform;

a plaintext input processing of inputting a plaintext to be encrypted and an initial vector;

an auxiliary variable generation processing of generating the auxiliary variable given to each of the encryption functions based on the initial vector and a size of the input plaintext;

a two-round Feistel encryption processing of applying the two-round Feistel structure to each plaintext chunk when dividing the plaintext into chunks per two blocks thereby to generate encrypted text chunks corresponding to the plaintext chunks;

a tag calculation processing of calculating a checksum of the plaintext, and applying the encryption function assigned with the auxiliary variable to the resultant checksum thereby to generate the authentication tag, assuming the initial vector N, a chunk index i, an i-th plaintext chunk MC[i]=(M[i_1], M[i_2]), a pair of auxiliary variables (N, Tw_i_1) and (N, Tw_i_2) corresponding to two plaintext blocks included in the plaintext chunk MC[i], and the encryption function F_K(*, *), in the two-round Feistel encryption processing, the program causing the computer to perform finding an i-th encrypted text chunk CC[i]=(C[i_1], C[i_2]) as:

$C[i\_1]=F\_K((N,Tw\_i\_1),M[i\_1])$ xor $M[i\_2]$, $C[i\_2]=F\_K((N,Tw\_i\_2),C[i\_1])$ xor $M[i\_1]$, and in the tag calculation processing, the program causing the computer to perform calculating the checksum of the plaintext by use of a plaintext block M[i_2] included in each plaintext chunk, and assuming the resultant checksum SUM, an auxiliary variable (N, Tw_T_1) given to the encryption function used for generating the authentication tag, and the encryption function F_K(*, *), finding the authentication tag T as:

$T=F\_K((N,Tw\_T\_1),SUM)$, a second two-round Feistel encryption processing of, when the input plaintext is divided into even blocks and a size of the last block is less than a predetermined block size, applying a predetermined two-round Feistel structure to the last plaintext chunk including the last plaintext block thereby to generate the last encrypted text chunk including the last encrypted text block; and a second tag calculation processing of, when the input plaintext is divided into even blocks and the size of the last block is less than the predetermined block size, calculating the checksum of the plaintext by use of the input plaintext and output from the second two-round Feistel encryption processing, and applying the encryption function assigned with e auxiliary variable to the resultant checksum thereby to generate the authentication tag, assuming an index m of the last plaintext chunk, the last plaintext block M[m_2], the last plaintext chunk MC[m]=(M[m_1], M[m_2]), a pair of auxiliary variables (N, Tw_m_1) and (N, Tw_m_2) corresponding to two plaintext blocks included in the last plaintext chunk MC[m], the encryption function $F\_K(*, *)$, a size s of the last plaintext block, a block size n, a padding processing pad_n( ) from s bits to n bits, and a cutting processing cut_s( ) from n bits to s bits, in the second two-round Feistel encryption processing, the program causing the computer to perform finding the last encrypted text chunk $CC[m]=(C[m\_1], C[m\_2])$ including the last encrypted text block C[m_2] with s bits as:

$C[m\_2]=\text{cut}\_s(Z)\text{xor } M[m\_2]$, $C[m\_1]=F\_K((N,Tw\_m\_2),\text{pad}\_n(C[m\_2]))\text{xor } M[m\_1]$ where $Z=F\_K((N, Tw\_m\_1), M[m\_1])$, and in the second tag calculation processing, the program causing the computer to perform calculating the checksum of the plaintext by use of a plaintext block M[i_2] included in each plaintext chunk except the last plaintext chunk, the Z, and C_n[m_2] obtained by padding the C[m_2] to n bits, and finds the authentication tag T as:

T=F_K((N, Tw_T_2), SUM) assuming the resultant checksum SUM, an auxiliary variable (N, Tw_T_2) given to the encryption function used for generating the authentication tag, and the encryption function $F\_K(*, *)$.

9. An authenticated encryption method wherein an information processing apparatus applies a two-round Feistel structure using an encryption function assigned with an auxiliary variable for a round function per two blocks to an input plaintext or encrypted text and generates an encrypted text or decoded plaintext, and applies the encryption function to a checksum calculated by use of some bits in the input plaintext or the decoded plaintext and generates an authentication tag, wherein the information processing apparatus performs a decode processing, in the decode processing, the information processing apparatus performs:

an encrypted text input processing of inputting an encrypted text to be decoded, an initial vector, and an authentication tag;

a decode auxiliary variable generation processing of generating the same auxiliary variable as in encryption, which is given to each of the encryption functions, based on the initial vector and a size of the input encrypted text;

a two-round Feistel decode processing of applying the two-round Feistel structure to each encrypted text chunk when dividing the encrypted text into chunks per two blocks thereby to generate decoded plaintext chunks corresponding to the encrypted text chunks;

a decode examination tag calculation processing of calculating the checksum of the decoded plaintext, and applying the encryption function assigned with the auxiliary variable to the resultant checksum thereby to generate a decode examination authentication tag;

a determination processing of determining whether the decode has succeeded or failed based on the decode examination authentication tag generated in the decode examination tag calculation processing and the input authentication tag, assuming the initial vector N, a chunk index i, an i-th encrypted text chunk $CC[i]=(C[i\_1], C[i\_2])$, a pair of auxiliary variables (N, Tw_i_1) and (N, Tw_i_2) corresponding to two encrypted text blocks included in the encrypted text chunk CC[i], and the encryption function $F\_K(*, *)$, in the two-round Feistel decode processing, the information processing apparatus finds an i-th decoded plaintext chunk $MC'[i]=(M'[i\_1], M'[i\_2])$ as:

$M'[i\_1]=F\_K((N,Tw\_i\_2),C[i\_1])\text{xor } C[i\_2]$, $M'[i\_2]=F\_K((N,Tw\_i\_1),M'[i\_1])\text{xor } C[i\_1]$, and in the decode examination tag calculation processing, the information processing apparatus calculates the checksum of the decoded plaintext by use of each decoded plaintext block M'[i_2] included in each decoded plaintext chunk, and finds a decode examination authentication tag T' as:

T'=F_K((N, Tw_T_1), SUM') assuming the resultant checksum SUM', an auxiliary variable (N, Tw_T_1) given to an encryption function used for generating a decode examination authentication tag, and an encryption function $F\_K(*, *)$, wherein in the decode processing, the information processing apparatus performs:

a second two-round Feistel decode processing of, when the input encrypted text is divided into even blocks and a size of the last block is less than a predetermined block size, applying a predetermined two-round Feistel structure to the last encrypted text chunk including the last encrypted text block thereby to generate the last decoded plaintext chunk including a decoded plaintext block of the last encrypted block; and a second decode examination tag calculation processing of, when the input encrypted text is divided into even blocks and the size of the last block is less than the predetermined block size, calculating the checksum of the decoded plaintext by use of output from the two-round Feistel decode processing, output from the second two-round Feistel decode processing, and the last encrypted text block, and applying the encryption function assigned with the auxiliary variable to the resultant checksum thereby to generate the decode examination authentication tag, assuming an index m of the last encrypted text chunk, the last encrypted text block C[m_2], the last encrypted text chunk $CC[m]=(C[m\_1], C[m\_2])$, a pair of auxiliary variables (N, Tw_m_1) and (N, Tw_m_2) corresponding to two encrypted text blocks included in the last encrypted text chunk CC[m], the encryption function $F\_K(*, *)$, a size s of the last encrypted text block, a block size n, a padding processing pad_n( ) from s bits to n bits, and a cutting processing cut_s( ) from n bits to s bits, in the second two-round Feistel decode processing, the information processing apparatus finds the last decoded plaintext chunk $MC'[m]=(M'[m\_1], M'[m\_2])$ including the last decoded plaintext block M'[m_2] with s bits as:

$M'[m\_1]=F\_K((N,Tw\_m\_2),\text{pad}\_n(C[m\_2]))\text{xor } C[m\_1]$, $M'[m\_2]=\text{cut}\_s(Z')\text{xor } C[m\_2]$, where $Z'=F\_K((N, Tw\_m\_1), M'[m\_1])$, and in the second decode examination tag calculation processing, the information processing apparatus calculates the checksum of the decoded plaintext by use of a decoded plaintext block M'[i_2] included in each decoded plaintext chunk except the last decoded plain-

47 text chunk, the Z', and C_n[m_2] obtained by padding the C[m_2] to n bits, and finds the decode examination authentication tag T' as:

T'=F_K((N, Tw_T_2), SUM') assuming the resultant checksum SUM', an auxiliary variable (N, Tw_T_2) given to the encryption function used for generating the decode examination authentication tag, and the encryption function F_K(*, *).

10. A non-transitory computer-readable recording medium in which a program for authenticated encryption is recorded, the program causing a computer to perform:

a processing of applying a two-round Feistel structure using an encryption function assigned with an auxiliary variable for a round function per two blocks to an input plaintext or encrypted text and generating an encrypted text or decoded plaintext, and applying the encryption function to a checksum calculated by use of some bits in the input plaintext or the decoded plaintext and generating an authentication tag, wherein the program causing the computer to perform a decode processing, in the decode processing, the program causing the computer to perform:

an encrypted text input processing of inputting an encrypted text to be decoded, an initial vector, and an authentication tag;

a decode auxiliary variable generation processing of generating the same auxiliary variable as in encryption, which is given to each of the encryption functions, based on the initial vector and a size of the input encrypted text;

a two-round Feistel decode processing of applying the two-round Feistel structure to each encrypted text chunk when dividing the encrypted text into chunks per two blocks thereby to generate decoded plaintext chunks corresponding to the encrypted text chunks;

a decode examination tag calculation processing of calculating the checksum of the decoded plaintext, and applying the encryption function assigned with the auxiliary variable to the resultant checksum thereby to generate a decode examination authentication tag;

a determination processing of determining whether the decode has succeeded or failed based on the decode examination authentication tag generated in the decode examination tag calculation processing and the input authentication tag, assuming the initial vector N, a chunk index i, an i-th encrypted text chunk CC[i]=(C[i_1], C[i_2]), a pair of auxiliary variables (N, Tw_i_1) and (N, Tw_i_2) corresponding to two encrypted text blocks included in the encrypted text chunk CC[i], and the encryption function F_K(*, *), in the two-round Feistel decode processing, the program causing the computer to perform finding an i-th decoded plaintext chunk MC'[i]=(M'[i_1], M'[i_2]) as:

$M'[i\_1]=F\_K((N,Tw\_i\_2),C[i\_1])$xor $C[i\_2]$, $M'[i\_2]=F\_K((N,Tw\_i\_1),M'[i\_1])$xor $C[i\_1]$, and in the decode examination tag calculation processing, the program causing the computer to perform calculating the checksum of the decoded plaintext by use of each

48 decoded plaintext block M'[i_2] included in each decoded plaintext chunk, and finding the decode examination authentication tag T' as:

T'=F_K((N, Tw_T_1), SUM') assuming the resultant checksum SUM', an auxiliary variable (N, Tw_T_1) given to the encryption function used for generating the decode examination authentication tag, and the encryption function F_K(*, *), a second two-round Feistel decode processing of, when the input encrypted text is divided into even blocks and a size of the last block is less than a predetermined block size, applying a predetermined two-round Feistel structure to the last encrypted text chunk including the last encrypted text block thereby to generate the last decoded plaintext chunk including a decoded plaintext block of the last encrypted block; and a second decode examination tag calculation processing of, when the input encrypted text is divided into even blocks and the size of the last block is less than the predetermined block size, calculating the checksum of the decoded plaintext by use of output from the two-round Feistel decode processing, output from the second two-round Feistel decode processing, and the last encrypted text block, and applying the encryption function assigned with the auxiliary variable to the resultant checksum thereby to generate the decode examination authentication tag, assuming an index m of the last encrypted text chunk, the last encrypted text block C[m_2], the last encrypted text chunk CC[m]=(C[m_1], C[m_2]), a pair of auxiliary variables (N, Tw_m_1) and (N, Tw_m_2) corresponding to two encrypted text blocks included in the last encrypted text chunk CC[m], the encryption function F_K(*, *), a size s of the last encrypted text block, a block size n, a padding processing pad_n( ) from s bits to n bits, and a cutting processing cut_s( ) from n bits to s bits, in the second two-round Feistel decode processing, the program causing the computer to perform finding the last decoded plaintext chunk MC'[m]=(M'[m_1], M'[m_2]) including the last decoded plaintext block M'[m_2] with s bits as:

$M'[m\_1]=F\_K((N,Tw\_m\_2),\text{pad}\_n(C[m\_2]))$xor $C[m\_1]$, $M'[m\_2]=\text{cut}\_s(Z')$xor $C[m\_2]$, where Z'=F_K((N, Tw_m_1), M'[m_1]), and in the second decode examination tag calculation processing, the program causing the computer to perform calculating the checksum of the decoded plaintext by use of a decoded plaintext block M'[i_2] included in each decoded plaintext chunk except the last decoded plaintext chunk, the Z', and C_n[m_2] obtained by padding the C[m_2] to n bits, and finding the decode examination authentication tag T' as:

T'=F_K((N, Tw_T_2), SUM') assuming the resultant checksum SUM', an auxiliary variable (N, Tw_T_2) given to the encryption function used for generating the decode examination authentication tag, and the encryption function F_K(*, *).

* * * * *